US007176652B2

(12) United States Patent
Wakabayashi et al.

(10) Patent No.: US 7,176,652 B2
(45) Date of Patent: Feb. 13, 2007

(54) MOTOR CONTROL APPARATUS

(75) Inventors: Kenichi Wakabayashi, Kariya (JP); Soichi Yoshinaga, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/257,310

(22) Filed: Oct. 25, 2005

(65) Prior Publication Data

US 2006/0038531 A1    Feb. 23, 2006

Related U.S. Application Data

(63) Continuation of application No. PCT/JP05/07365, filed on Apr. 12, 2005.

(30) Foreign Application Priority Data

Apr. 15, 2004 (JP) .............................. 2004-120824
Mar. 10, 2005 (JP) .............................. 2005-067654

(51) Int. Cl.
     *H02P 27/04*    (2006.01)
(52) U.S. Cl. ...................... 318/807; 318/722; 318/254; 318/801
(58) Field of Classification Search .................... None
     See application file for complete search history.

(56) References Cited

U.S. PATENT DOCUMENTS

| | | | |
|---|---|---|---|
| 6,492,788 B1* | 12/2002 | Agirman et al. ............ 318/700 |
| 6,611,771 B1* | 8/2003 | Habetler et al. .............. 702/58 |
| 6,674,262 B2 | 1/2004 | Kitajima et al. | |
| 6,727,675 B2* | 4/2004 | Yoshimoto et al. ......... 318/700 |
| 2002/0097015 A1* | 7/2002 | Kitajima et al. ............ 318/432 |
| 2003/0052641 A1* | 3/2003 | Yoshimoto et al. ......... 318/700 |
| 2004/0195993 A1* | 10/2004 | Yoshimoto et al. ......... 318/802 |
| 2005/0073280 A1 | 4/2005 | Yoshinaga et al. | |
| 2005/0207190 A1* | 9/2005 | Gritter ......................... 363/40 |

FOREIGN PATENT DOCUMENTS

| | | |
|---|---|---|
| JP | A 2000-102168 | 4/2000 |
| JP | A 2002-10686 | 1/2002 |
| JP | B2 3323759 | 6/2002 |
| JP | A 2002-223600 | 8/2002 |
| JP | A 2002-247899 | 8/2002 |
| JP | A 2002-291283 | 10/2002 |
| JP | A 2004-064909 | 2/2004 |
| WO | WO 2004/055967 A1 | 7/2004 |

\* cited by examiner

*Primary Examiner*—Lincoln Donovan
*Assistant Examiner*—Renata McCloud
(74) *Attorney, Agent, or Firm*—Oliff & Berridge PLC

(57) ABSTRACT

An object of the present invention is to provide a motor control apparatus having excellent harmonic current control performance, that can simplify circuit configuration and circuit processing while, at the same time, achieving improved control accuracy. To achieve this object, detected motor currents are converted by coordinate converters 19 and 20 into an nth-order dq-axis signal and an mth-order dq-axis signal, and their DC components are extracted by low-pass filters 22 and 23; then, the differences of the DC components relative to respective command values are converted back into three-phase AC signals to control the motor currents.

14 Claims, 8 Drawing Sheets

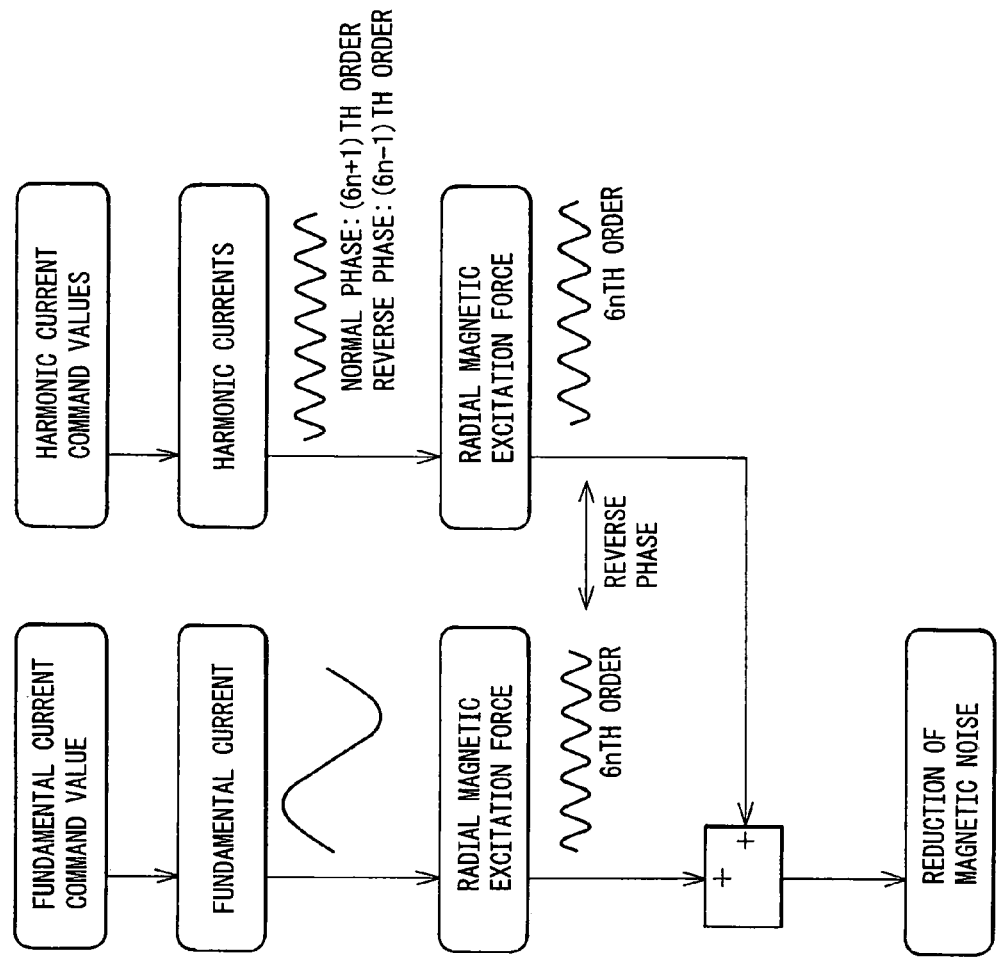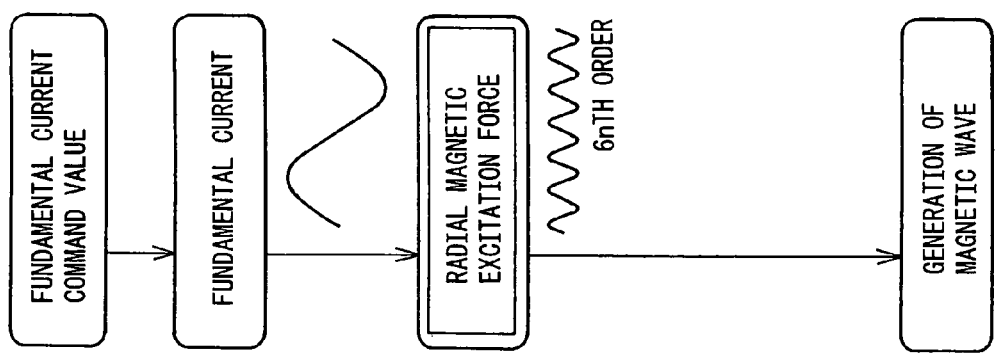

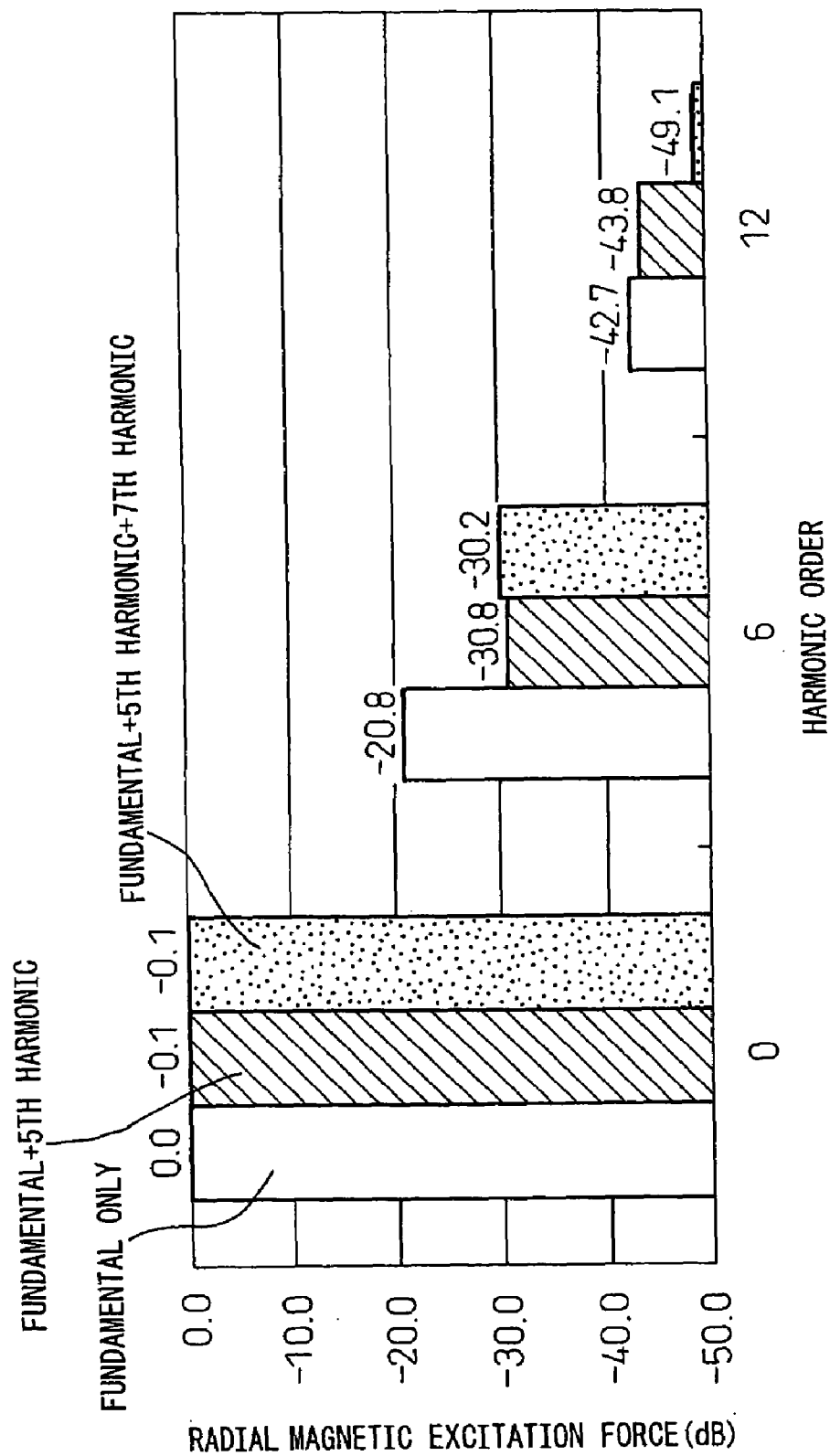

US 7,176,652 B2

MOTOR CONTROL APPARATUS

This application is a continuation of International Application No. PCT/JP2005/007365, filed on Apr. 12, 2005.

TECHNICAL FIELD

The present invention relates to a motor control apparatus having an excellent harmonic current control performance.

BACKGROUND ART

As is well known, in a polyphase AC rotary electric machine, harmonic currents must be controlled properly because the efficiency and output of the motor drops, and the torque ripple increases, if the space harmonics of the magnetic flux are large. Motor controls for selectively controlling the harmonic current components contained in the motor current are disclosed in Japanese Unexamined Patent Publications No. 2002-247899 and No. 2002-223600.

Japanese Unexamined Patent Publications No. 2002-247899 and No. 2002-223600 each propose a motor control apparatus which extracts a harmonic current component by high-pass filtering a first-order dq signal of the motor current, and controls the harmonic current through feedback by converting the extracted harmonic current component into a dq signal rotating synchronously with the specified order harmonic component of a rotating magnetic field.

DISCLOSURE OF THE INVENTION

However, the harmonic current control that uses the motor control described in the above-cited Japanese Unexamined Patent Publications No. 2002-247899 and No. 2002-223600 has had the shortcoming that not only is the circuit configuration complex but, also, the coordinate conversion process is complicated, leading to an increased signal degradation and signal delay and hence, a degradation of the accuracy of the harmonic current control.

Furthermore, with the harmonic current control that uses the motor control described in the above-cited Japanese Unexamined Patent Publications No. 2002-247899 and No. 2002-223600, when components, such as the seventh harmonic current and the fifth harmonic component having a reverse phase order from it, are contained simultaneously that have the same frequency when converted to a first-order dq coordinate system, it has not been possible to extract the respective components separately.

The present invention has been devised in view of the above problems, and an object of the invention is to provide a motor control apparatus having excellent harmonic current control performance, that has a simple circuit configuration and circuit processing while, at the same time, achieves an improved control accuracy.

According to the invention that solves the above problems, there is provided a motor control apparatus for feedback-controlling a polyphase AC current to be fed to an armature of a rotary electric machine, comprising a harmonic control circuit block wherein the harmonic control circuit block includes: a high-order dq coordinate converter for converting the polyphase AC current into a high-order dq signal which is a signal defined in a high-order dq coordinate system rotating at a frequency corresponding to the harmonic order of a harmonic current component to be controlled from among harmonic current components contained in the polyphase AC current; a low-pass filter for extracting a DC signal component contained in the high-order dq signal; a subtractor for obtaining a difference between the DC signal component and a command value for the same; and a high-order polyphase coordinate converter for converting a signal for asymptotically reducing the difference to zero into an original polyphase AC current coordinate system, and wherein the harmonic current component to be controlled is controlled by feeding the harmonic current component output from the harmonic control circuit block to the armature.

That is, in this invention, by projecting the entire motor current onto the rotating coordinate system rotating at the frequency corresponding to the harmonic order of the harmonic current component to be controlled, the harmonic current component to be controlled is converted into a DC component, and all the harmonic current components of other orders contained in the motor current, as well as the fundamental frequency component thereof, are converted into harmonic components in the rotating coordinate system, after which only the harmonic current component to be controlled is extracted by means of the low-pass filter. Then, the harmonic current component to be controlled, extracted in the form of a DC signal, is compared with its command value likewise given in the form of a DC signal, and the result of the comparison is converted back into the original stationary coordinate system, i.e., the polyphase AC coordinate system, and added to the motor current.

When converting the harmonic current component to be controlled into the rotating coordinate system corresponding to the order of the harmonic current component to be controlled, the other harmonic current components, whose harmonic orders are different from the harmonic order of the harmonic current component to be controlled, and the fundamental frequency component, are converted into harmonic current components whose harmonic orders are equal to their original orders minus the harmonic order of the harmonic current component to be controlled.

Accordingly, even if the frequency of the harmonic current component of the order to be controlled frequently changes due to frequent changes in the number of revolutions, the harmonic current component of the order to be controlled can be controlled to the necessary level while suppressing signal degradation, by using simple low-pass filtering and simple circuitry. Furthermore, as the frequency of the signal to be feedback-controlled is predominantly a DC signal component, the extraction of the harmonic current component to be controlled and the signal processing thereafter are facilitated, and phase compensation associated with the control does not present a problem.

A simple method of controlling the fundamental frequency component of the motor current is to project the fundamental frequency component of the detected motor current onto a first-order rotating coordinate system (preferably, a first-order dq coordinate system) corresponding to that frequency and to extract it as a DC signal component for feedback control, but the method is not limited to this particular one; for example, the feedback control may be performed directly by using the detected motor current, i.e., the motor current in the stationary coordinate system, or open-loop control may be employed. Preferably, in the above feedback control, PI (proportional-integral) voltages for reducing the respective differences to zero are generated and are converted into polyphase voltages in a polyphase AC coordinate system (stationary coordinate system); then, the polyphase voltages respectively corresponding to the fundamental frequency component and harmonic current components of the motor current to be fed to the motor are summed on a phase-by-phase basis to produce sum phase voltages, and the phase voltages to be applied to the armature are generated based on the sum phase voltages. This control is, in itself, similar to the prior-known motor feedback control.

In a preferred mode, the high-order dq coordinate converter performs a dq conversion on an nth harmonic current to be superimposed in reverse phase order on the fundamental frequency component, by using a -nth-order coordinate system which is a coordinate system rotating at n times the frequency of the fundamental frequency component in a direction opposite to the direction of rotation of a dq rotating coordinate system rotating synchronously with the fundamental frequency component. In this way, even if the armature current has a harmonic current component having a reverse phase order from its fundamental frequency component, the harmonic current component can be controlled to a desired level without any problem. However, when the high-order dq coordinate converter performs the dq coordinate conversion on the harmonic current component by using the −nth-order dq rotating coordinate system, the high-order polyphase coordinate converter also must perform coordinate conversion for converting the −nth-order dq signal, i.e., the nth order in reverse phase order, into the three-phase AC current coordinate system so as to produce three-phase AC currents in reverse phase order.

In a preferred mode, the motor control apparatus comprises a plurality of harmonic control circuit blocks, each identical to the one described above, wherein the harmonic order of the harmonic current component to be controlled is different for each of the harmonic control circuit blocks. In this way, a plurality of harmonic current components can be controlled accurately by using simple circuitry and simple processing.

In a preferred mode, the motor control apparatus modifies magnetic noise by controlling the harmonic current component to be fed to the armature. In this way, the magnetic noise can be adjusted to a desired level accurately by using simple circuitry.

In a preferred mode, for the magnetic noise and vibration frequency also, control is performed by reference to the fundamental frequency (first component) of the polyphase AC current; that is, when the harmonic current component output from the harmonic control circuit block has the same phase order as the fundamental frequency component of the polyphase AC current, the harmonic order of the harmonic current component to be controlled is set higher by 1 than the harmonic order of the magnetic noise, and when the harmonic current component output from the harmonic control circuit block has a reverse phase order from the fundamental frequency component of the polyphase AC current, the harmonic order of the harmonic current component to be controlled is set lower by 1 than the harmonic order of the magnetic noise. With this configuration, a prescribed harmonic component of the magnetic noise can be controlled effectively.

Though the details will be given in the description of embodiments, when a harmonic frequency component having the same phase order as the fundamental frequency component of the motor current is added to the motor current, a radial vibration occurs that has a harmonic order equal to the harmonic order of the harmonic frequency component having the same phase order minus the harmonic order (1) of the fundamental frequency component. Accordingly, by controlling the harmonic frequency component having the same phase order, the harmonic component of the noise having a harmonic order lower by 1 than the harmonic order of the harmonic frequency component can be controlled. On the other hand, when a harmonic frequency component having a reverse phase order from the fundamental frequency component of the motor current is added to the motor current, a radial vibration occurs that has a harmonic order equal to the harmonic order of the harmonic frequency component having the reverse phase order plus the harmonic order (1) of the fundamental frequency component. Accordingly, by controlling the harmonic frequency component having the reverse phase order, the harmonic component of the noise having a harmonic order higher by 1 than that of the harmonic frequency component having the reverse phase order can be controlled. The reverse phase order here refers to the phase rotation order of the polyphase armature current. To describe this in further detail, the harmonic order of the harmonic current component having the reverse phase order can be regarded as being equal to that harmonic order but negative in sign. When two different harmonic current components are fed, a harmonic noise component equal to the difference between the harmonic orders of the harmonic current components is generated; therefore, when the harmonic current component having the reverse phase order is added to the fundamental frequency component, there occurs a harmonic noise component whose harmonic order is higher by 1 than that of the harmonic current component having the reverse phase order.

Further, in this mode, a plurality of harmonic current components having different harmonic orders can be added to the motor current. As described above, in the case of the same phase order, the harmonic order of the each harmonic current component is set lower by 1 than the value obtained by multiplying the fundamental frequency component by an integer not smaller than 2, while in the case of the reverse phase order, the harmonic order of the each harmonic current component is set higher by 1 than the value obtained by multiplying the fundamental frequency component by an integer not smaller than 2. By so doing, a larger number of harmonic noise components can be controlled, because harmonic noise components equal to the differences between the harmonic orders of the respective harmonic current components are generated. For details, refer to the description of embodiments to be given later.

In a preferred mode, the polyphase AC rotary electric machine is a three-phase AC rotary electric machine, and when the harmonic current component output from the harmonic control circuit block has the same phase order as the fundamental frequency component of the polyphase AC current, the harmonic order of the harmonic current component to be controlled is set to 6k+1 (k is a natural number), while when the harmonic current component output from the harmonic control circuit block has a reverse phase order from the fundamental frequency component of the polyphase AC current, the harmonic order of the harmonic current component to be controlled is set to 6k−1. With this configuration, magnetic noise components equal to prescribed multiples of the fundamental frequency components can be controlled effectively. The technical details of this control will be given later in the description of embodiments.

In a preferred mode, the motor control apparatus comprises at least one harmonic control circuit block for outputting the harmonic current component of reverse phase order whose harmonic order is 6k−1, and at least one harmonic control circuit block for outputting the harmonic current component of the same phase order whose harmonic order is 6k+1. With this configuration, a plurality of harmonic noise components having different harmonic orders can be easily controlled.

In a further preferred mode, three or more harmonic control circuit blocks are provided, at least one of which is the harmonic control circuit block for outputting the harmonic current component of reverse phase order whose harmonic order is 6k−1, and at least the other one of which is the harmonic control circuit block for outputting the harmonic current component of the same phase order whose harmonic order is 6k+1. With this configuration, it become possible to control a large number of harmonic noise components. It is also possible to provide four or more harmonic control circuit blocks.

In a preferred mode, the harmonic current component of a prescribed order to be superimposed on the polyphase AC current by the harmonic control circuit block is chosen to have an amplitude and phase that reduces the magnetic noise of the polyphase AC rotary electric machine. That is, by superimposing the harmonic current on the polyphase AC current to be fed to the polyphase AC rotary electric machine, a vibration (especially, radial vibration) having a prescribed harmonic order relationship to the superimposed harmonic current can be induced in the core of the polyphase AC rotary electric machine; therefore, by adjusting the phase and amplitude of the vibration induced by the superimposed harmonic current, it becomes possible to reduce the amplitude of the resultant vibration resulting from the combination of the vibration induced by the superimposed harmonic current and the vibration having the same harmonic order and generated in the core before the superimposition of the harmonic current. Accordingly, the magnetic noise generated by the resultant vibration can be reduced to a lower level than the level before the superimposition of the harmonic current.

BRIEF DESCRIPTION OF THE DRAWINGS

FIG. 9A is a diagram showing a magnetic noise generation flow (without harmonic control) according to the prior art where no harmonic current components for magnetic noise reduction are superimposed in a magnetic noise control flow for canceling 6 nth-order magnetic noise (n is a positive integer).

FIG. 9B is a diagram showing a magnetic noise control flow (with harmonic control) where harmonic current components for magnetic noise reduction are superimposed in a magnetic noise control flow for canceling 6nth-order magnetic noise (n is a positive integer).

FIG. 12 is a diagram showing the spectra of the radially acting magnetic excitation forces obtained in the experiment (the average value of fundamentals is taken as 0 dB ($dB=20\log_{10}$), and the value of each component is plotted against the average value of fundamentals).

BEST MODE FOR CARRYING OUT THE INVENTION

Preferred embodiments of the motor control apparatus of the present invention will be described below. Characters n and m given hereinafter denote integers not smaller than 2, and are set, for example, to 5 (reverse phase order), 7 (normal phase order), 11 (reverse phase order), 13 (normal phase order), 17 (reverse phase order), 19 (normal phase order), and so on in the case of a three-phase electric machine. It will also be understood that the term "DC component" used herein includes not only the true DC component but also a low-frequency AC component that occurs, for example, when the command value or the number of revolutions is changed.

(Embodiment 1)

A first embodiment will be described with reference to the block circuit diagram shown in FIG. 1.

(Configuration)

Figure 1:
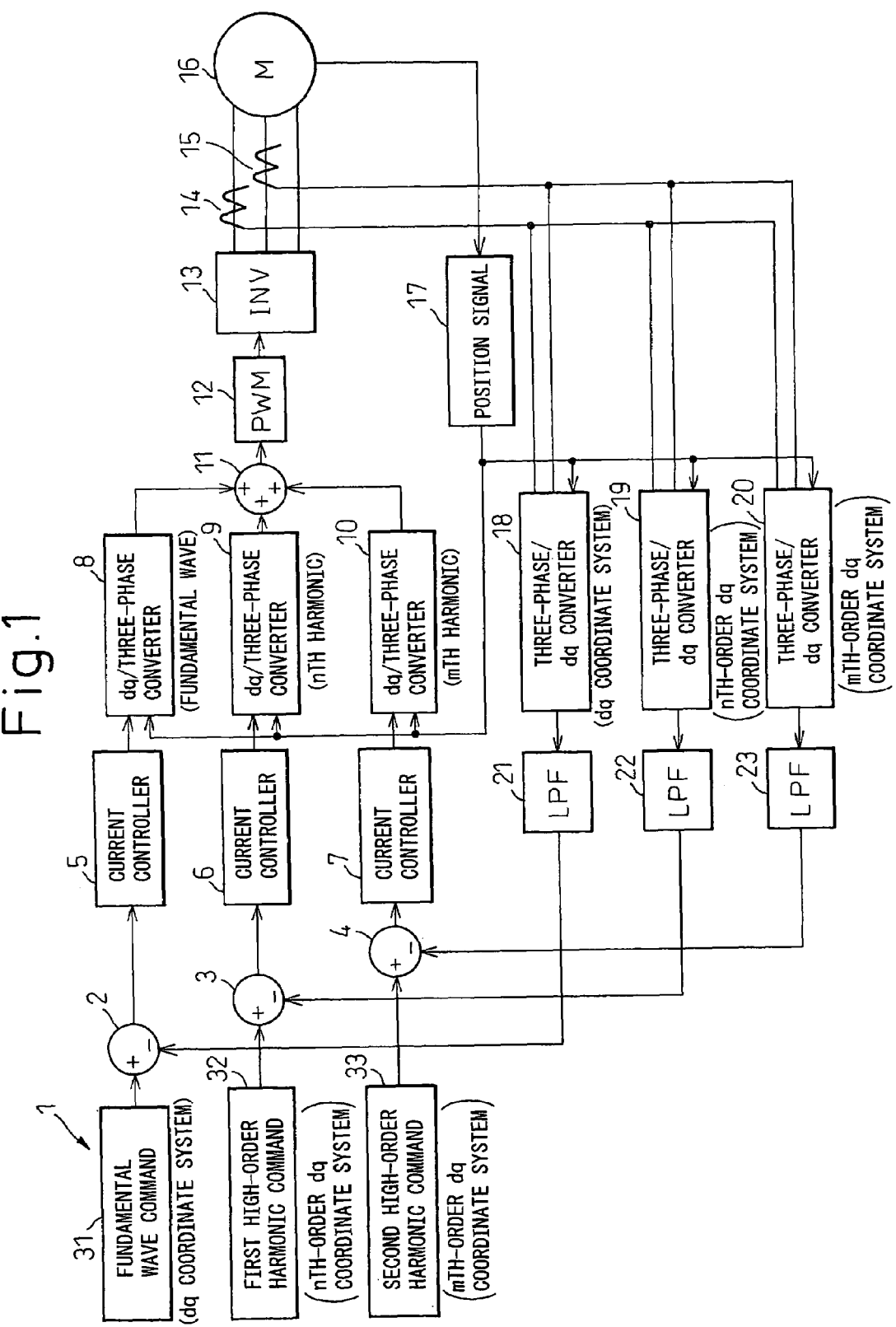
FIG. 1 is a block circuit diagram showing a motor control apparatus according to a first embodiment.

In FIG. 1, reference numeral 1 is an electric current commanding section, 2 to 4 are subtractors, 5 to 7 are PI amplifiers, 8 to 10 are dq/three-phase coordinate converters, 11 is an adder, 12 is a PWM voltage generating circuit, 13 is a three-phase inverter, 14 and 15 are current sensors for detecting two phase currents, 16 is a three-phase synchronous motor, 17 is a position signal processor for extracting a signal corresponding to a rotation angle θ from the rotation angle signal output from a rotation angle sensor (not shown) such as a resolver that detects the rotation angle of the three-phase synchronous motor 16, 18 to 20 are three-phase/dq coordinate converters, and 21 to 23 are low-pass filters whose cut-off frequencies are lower than several hundred Hertz.

The electric current commanding section 1 is a circuit that outputs an electric current command value for each harmonic order of the current, and comprises a fundamental wave command block 31 which outputs a command value for the first-order current (fundamental current component), a first high-order harmonic command block 32 which outputs a command value for an nth-order current (nth harmonic current component, where n is an integer not smaller than 2), and a second high-order harmonic command block 33 which outputs a command value for an mth-order current (mth harmonic current component, where m is an integer not smaller than 2).

The dq/three-phase coordinate converter 8 is a coordinate conversion circuit which converts a first-order dq signal input thereto into a three-phase AC current, the dq/three-phase coordinate converter 9 is a coordinate conversion circuit which converts an nth-order dq signal input thereto into a three-phase AC current, and the dq/three-phase coordinate converter 10 is a coordinate conversion circuit which converts an mth-order dq signal input thereto into a three-phase AC current.

The three-phase/dq coordinate converter 18 is a coordinate conversion circuit which converts a three-phase AC current input thereto into a first-order dq signal, the three-phase/dq coordinate converter 19 is a coordinate conversion circuit which converts a three-phase AC current input thereto into an nth-order dq signal, and the three-phase/dq coordinate converter 20 is a coordinate conversion circuit which converts a three-phase AC current input thereto into an mth-order dq signal.

All or some of the circuit blocks, other than the PWM voltage generating circuit 12, the three-phase inverter 13, the current sensors 14 and 15, the three-phase synchronous motor 16, the rotation angle sensor, etc., can be constructed using dedicated circuits or DSP circuits, or can be implemented as a software process.

(Description of the Operation)

The following description is given by assuming, for purposes of simplification, that only the first-order, nth-order, and mth-order currents flow in the motor 16. The U-phase current iu and V-phase current iv detected by the current sensors 14 and 15 are supplied to the three-phase/first-order dq coordinate converter 18, three-phase/nth-order dq coordinate converter 19, and three-phase/mth-order dq coordinate converter 20.

The three-phase/first-order dq coordinate converter 18 is a circuit that converts the detected three-phase AC current into a first-order dq signal in a dq coordinate system rotating at the fundamental frequency of the motor current. The three-phase/nth-order dq coordinate converter 19 is a circuit that converts the detected three-phase AC current into an nth-order dq signal in an nth-order dq coordinate system which is a dq coordinate system rotating at n times the fundamental frequency of the motor current. The three-phase/mth-order dq coordinate converter 20 is a circuit that converts the detected three-phase AC current into an mth-order dq signal in an mth-order dq coordinate system which is a dq coordinate system rotating at m times the fundamental frequency of the motor current.

The low-pass filter 21 extracts the DC component of the first-order dq signal output from the coordinate converter 18, and supplies it to the subtractor 2. The DC component of the first-order dq signal is actually a signal that corresponds to the fundamental current component of the motor current. The low-pass filter 22 extracts the DC component of the nth-order dq signal output from the coordinate converter 19, and supplies it to the subtractor 3. The DC component of the nth-order dq signal is actually a signal that corresponds to the nth harmonic current component of the motor current. The low-pass filter 23 extracts the DC component of the mth-order dq signal output from the coordinate converter 20, and supplies it to the subtractor 4. The DC component of the mth-order dq signal is actually a signal that corresponds to the mth harmonic current component of the motor current.

The subtractor 2 takes as inputs the first-order current command supplied in the form of a first-order dq signal from the fundamental wave command block 31 and the first-order dq signal supplied from the low-pass filter 21, and subtracts one from the other separately in terms of the d-axis current and q-axis current, respectively, to extract a first-order d-axis current difference $\Delta id1$ and a first-order q-axis current difference $\Delta iq1$; the two current differences $\Delta id1$ and $\Delta iq1$ thus extracted are supplied to the current controller 5 which is a PI amplifier. The current controller 5 computes first-order voltage commands Vd1 and Vq1 for reducing the respective differences to zero, and supplies the computed first-order voltage commands Vd1 and Vq1 to the first-order dq/three-phase AC coordinate converter 8.

The subtractor 3 takes as inputs the nth-order current command supplied in the form of an nth-order dq signal from the first high-order harmonic command block 32 and the nth-order dq signal supplied from the low-pass filter 22, and subtracts one from the other separately in terms of the d-axis current and q-axis current, respectively, to extract an nth-order d-axis current difference $\Delta idn$ and an nth-order q-axis current difference $\Delta iqn$; the two current differences $\Delta idn$ and $\Delta iqn$ thus extracted are supplied to the current controller 6 which is a PI amplifier. The current controller 6 computes nth-order voltage commands Vdn and Vqn for reducing the respective differences to zero, and supplies the computed nth-order voltage commands Vdn and Vqn to the nth-order dq/three-phase AC coordinate converter 9.

The subtractor 4 takes as inputs the mth-order current command supplied in the form of an mth-order dq signal from the second high-order harmonic command block 33 and the mth-order dq signal supplied from the low-pass filter 23, and subtracts one from the other separately in terms of the d-axis current and q-axis current, respectively, to extract an mth-order d-axis current difference $\Delta idm$ and an mth-order q-axis current difference $\Delta iqm$; the two current differences $\Delta idm$ and $\Delta iqm$ thus extracted are supplied to the current controller 7 which is a PI amplifier. The current controller 7 computes mth-order voltage commands Vdm and Vqm for reducing the respective differences to zero, and supplies the computed mth-order voltage commands Vdm and Vqm to the mth-order dq/three-phase AC coordinate converter 10.

The first-order dq/three-phase coordinate converter 8 converts the thus supplied first-order voltage commands Vd1 and Vq1 into three-phase voltage command values in the stationary coordinate system, the nth-order dq/three-phase coordinate converter 9 converts the thus supplied nth-order voltage commands Vdn and Vqn into three-phase voltage command values in the stationary coordinate system, and the mth-order dq/three-phase coordinate converter 10 converts the thus supplied mth-order voltage commands Vdm and Vqm into three-phase voltage command values in a stationary coordinate system; these three kinds of three-phase voltage commands are summed on a phase-by-phase basis to produce three-phase sum voltage commands.

The three-phase sum voltage commands are converted by the PWM voltage generating circuit 12 into PWM voltages to control the PWM duty ratio of the three-phase inverter 13, and the three-phase inverter 13 controls the three-phase AC currents to be fed to the three-phase synchronous motor 29.

The first-order dq coordinate converter 18, the nth-order dq coordinate converter 19, and the mth-order dq coordinate converter 20 each perform a coordinate conversion from the stationary coordinate system to the rotating coordinate system of the corresponding order by reference to the detected rotation angle $\theta$. It will therefore be appreciated that the rotation angle $\theta$ in the first-order dq coordinate converter 18 corresponds to $n\theta$ in the nth-order dq coordinate converter 19 and $m\theta$ in the mth-order dq coordinate converter 20.

According to the motor control apparatus having the above circuit configuration, the fundamental current component and the nth and mth harmonic current components can be controlled independently of one another. Specifically, in the present embodiment, as the nth-order current control block consisting of the circuits 19, 22, 3, 6, and 9 and the mth-order current control block consisting of the circuits 20, 23, 4, 7, and 10 are provided in addition to the first-order current control block consisting of the circuits 18, 21, 2, 5, and 8, only the harmonic current component of the desired order can be accurately extracted using simple circuitry, irrespective of variations in the number of revolutions; furthermore, as feedback processing for harmonic current control can be performed by DC control, high-accuracy feedback control can be achieved without increasing the complexity of the circuit configuration.

Figure 2:
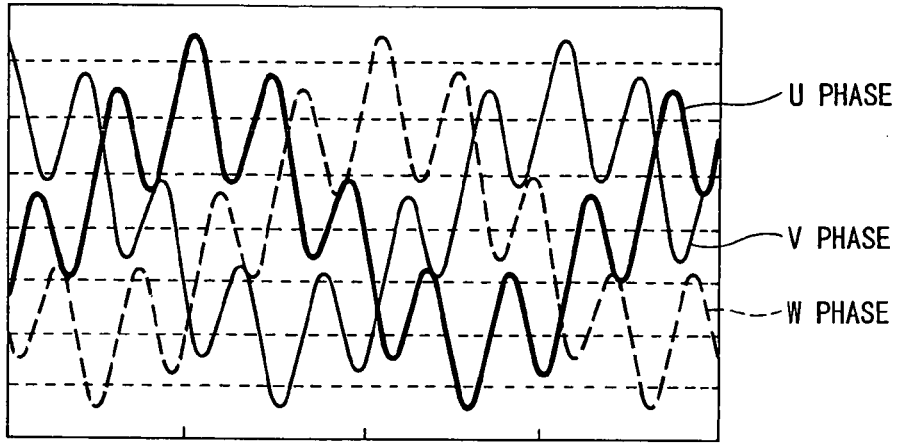
FIG. 2 is a waveform diagram showing by way of example the current waveforms of current sensor signals in FIG. 1.
Figure 3:
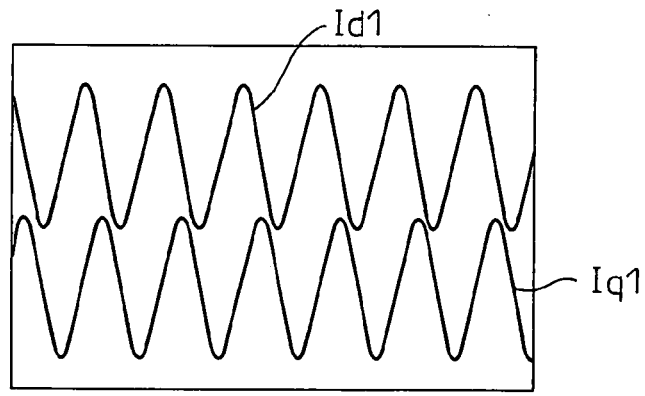
FIG. 3 is a waveform diagram showing the current waveforms of electric currents Id1 and Iq1 on a fundamental wave dq coordinate system in FIG. 1.
Figure 4:
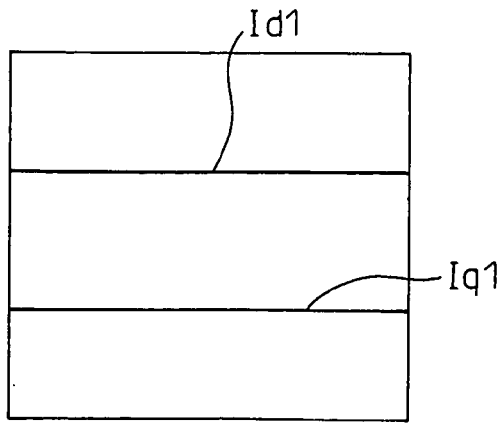
FIG. 4 is a waveform diagram showing the current waveforms of fundamental current components Id1 and Iq1 on the fundamental wave dq coordinate system in FIG. 1.
Figure 5:
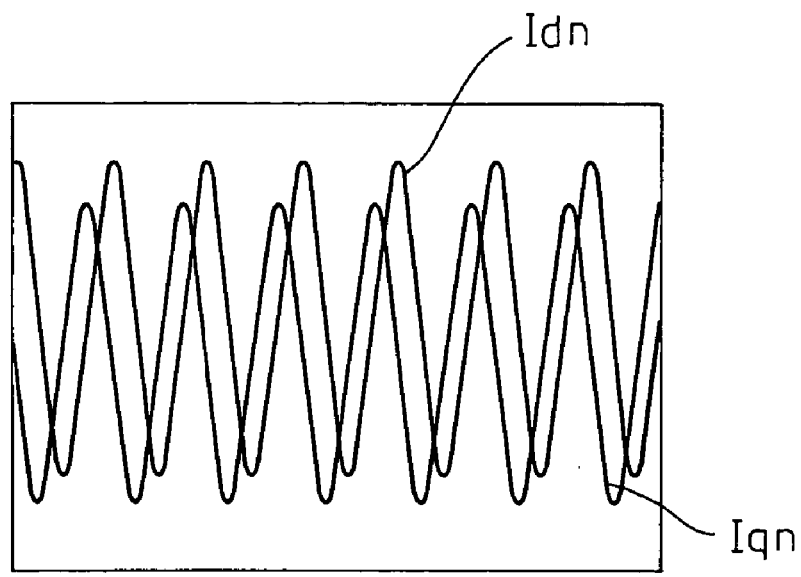
FIG. 5 is a waveform diagram showing the current waveforms of electric currents Idn and Iqn on an nth-order dq coordinate system in FIG. 1.
Figure 6:
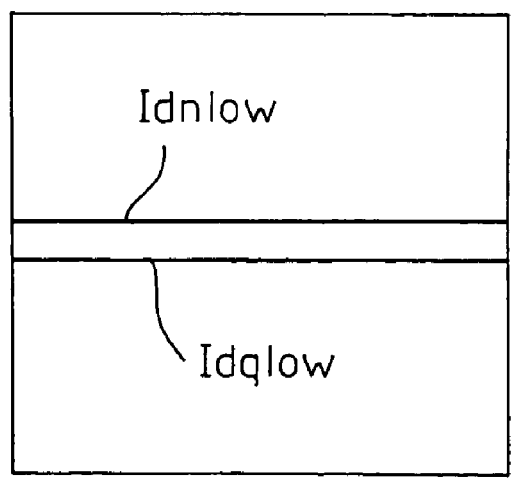
FIG. 6 is a waveform diagram showing the current waveforms of nth harmonic currents Idnlow and Iqnlow on the nth-order dq coordinate system in FIG. 1.

FIG. 2 shows, by way of example, the motor phase current waveforms controlled by the circuit of FIG. 1, FIG. 3 shows the current waveforms output from the circuit 18, FIG. 4 shows the current waveforms output from the circuit 21, FIG. 5 shows the current waveforms output from the circuit 19, and FIG. 6 shows the current waveforms output from the circuit 22.

(Description of Magnetic Noise Control)

Next, one control example based on the harmonic current versus magnetic noise relationship will be described in detail. The first high-order harmonic command block 32 and the second high-order harmonic command block 33 shown in FIG. 1, therefore, need only determine the amplitude and the phase angle of the harmonic current components of the respective orders based on the harmonic current versus harmonic magnetic noise relationship described hereinafter.

First, the basic principle of the magnetic noise control will be described below for the case where the present invention is applied to a three-phase AC rotary electric machine.

Figure 7:
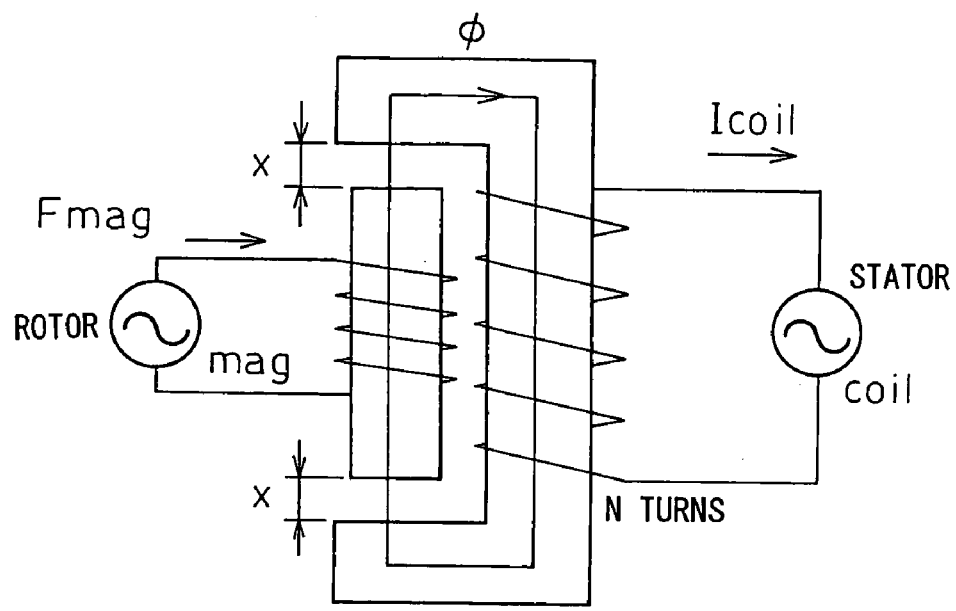
FIG. 7 is a diagram schematically showing a magnetic circuit for one phase of a three-phase AC rotary electric machine.
Figure 8:
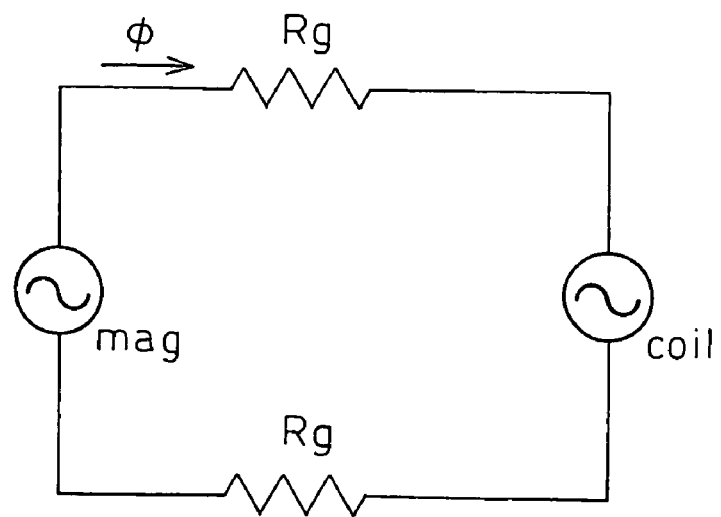
FIG. 8 is an equivalent magnetic circuit diagram of one phase portion (iron core not shown) of the magnetic circuit of FIG. 7.

FIG. 7 is a diagram schematically showing a magnetic circuit for one phase of the three-phase AC rotary electric machine, and FIG. 8 is an equivalent circuit diagram of the magnetic circuit of FIG. 7. In the synchronous machine, magnetic flux $\phi$ is formed by the magnetic poles of a rotor (formed from a coil or a permanent magnet), and rotor magnetomotive force Fmag represents the magnetomotive force, i.e., the magnetic field intensity, of the rotor's magnetic poles in the magnetic circuit, while stator magnetomotive force Fcoil represents the magnetomotive force, i.e., the magnetic field intensity, formed in the magnetic circuit by a stator current. Rg denotes the magnetic resistance of a gap between the stator and the rotor. In the above figures and the equations shown below, Icoil is the stator current (the phase current of the armature), x is the gap width, S is the opposing area size of the gap, $\mu 0$ is the permeability of air, and N is the number of turns in each phase coil of the armature.

The magnetic flux is defined by equation 1, the magnetic energy by equation 2, the magnetic excitation force by equation 3, the rotor magnetomotive force and stator current for U phase by equation 4, the rotor magnetomotive force and stator current for V phase by equation 5, and the rotor magnetomotive force and stator current for W phase by equation 6. Here, the rotor magnetomotive force is expressed as a sine wave function because the rotor schematically shown in FIG. 1 rotates in the actual rotary electric machine. That is, the magnetic excitation force f is defined as the sum of the square of the rotor magnetomotive force, the square of the stator magnetomotive force, and the product of the rotor magnetomotive force and the stator magnetomotive force. In the example shown here, the rotor magnetomotive force contains, in addition to the fundamental frequency component (first component), the third, fifth, and seventh harmonics arising due to the effects of rotor shape, etc. It is also assumed here that stator current contains only the fundamental frequency component. Of course, the rotor magnetomotive force and the stator current may each contain harmonics other than those stated here.

Magnetic flux $$\phi = \frac{F_{mag} + F_{coil}}{2R_g} = \frac{F_{mag} + NI_{coil}}{2R_g}$$

Equation 1

Magnetic energy $$W = \frac{1}{2}\phi^2 R_g = \frac{1}{8R_g}(F_{mag} + NI_{coil})^2 = \frac{1}{8x}(F_{mag} + NI_{coil})^2 \mu_0 S$$

Equation 2

Magnetic excitation force $$f = \frac{\partial W}{\partial x} = \frac{1}{8x^2}\mu_0 S(F_{mag} + NI_{coil})^2 \propto (F_{mag} + NI_{coil})^2 = F_{mag}^2 + 2NF_{mag}I_{coil} + N^2 I_{coil}^2$$

Equation 3

U phase

Equation 4

$$\begin{cases} \text{Rotor magnetomotive force} \quad F_{mag} = \underset{\text{Fundamental (first harmonic)}}{F_1\sin(\theta+\alpha)} + \underset{\text{3rd harmonic}}{F_3\sin3(\theta+\beta)} + \underset{\text{5th harmonic}}{F_5\sin5(\theta+\gamma)} + \underset{\text{7th harmonic}}{F_7\sin7(\theta+\delta)} \\ \text{Stator current} \quad I_{coil} = \underset{\text{Fundamental (first harmonic)}}{I_1\sin(\theta+s)} \end{cases}$$

V phase

Equation 5

$$\begin{cases} \text{Rotor magnetomotive force} \quad F_{mag} = F_1\sin(\theta+\alpha-120) + F_3\sin3(\theta+\beta-120) + \\ \qquad\qquad\qquad\qquad\qquad\qquad F_5\sin5(\theta+\gamma-120) + F_7\sin7(\theta+\delta-120) \\ \text{Stator current} \quad I_{coil} = I_1\sin(\theta+s-120) \end{cases}$$

-continued

W phase  Equation 6

$$\begin{cases} \text{Rotor magnetomotive force} & F_{mag} = F_1\sin(\theta + \alpha - 240) + F_3\sin3(\theta + \beta - 240) + \\ & F_5\sin5(\theta + \gamma - 240) + F_7\sin7(\theta + \delta - 240) \\ \text{Stator current} & I_{coil} = I_1\sin(\theta + s - 240) \end{cases}$$

When the magnetic excitation forces (sometimes simply called the excitation forces) for the respective phases are calculated from the equations 4 to 6 in conjunction with the equation 3, the following equations 7 to 9 are obtained.

Equation 7

U-phase excitation force $fu \propto$ — Inphase term which, when vector summed between the three phases, contributes to producing reinforcement ... Term for which the vector sum between the three phases is zero $$\frac{1}{2}(F_1^2 + F_3^2 + F_5^2 + F_7^2) - \frac{F_1^2}{2}\cos2(\theta + \alpha) - \frac{F_3^2}{2}\cos6(\theta + \beta) - \frac{F_5^2}{2}\cos10(\theta + \gamma) - \frac{F_7^2}{2}\cos14(\theta + \delta)$$

$$- F_1F_3\big[\cos\{4\theta + \alpha + 3\beta\} - \cos\{2\theta - \alpha + 3\beta\}\big] - F_1F_5[\cos\{6\theta + \alpha + 5\gamma\} - \cos\{4\theta - \alpha + 5\gamma\}] -$$

$$F_1F_7\big[\cos\{8\theta + \alpha + 7\delta\} - \cos\{6\theta - \alpha + 7\delta\}\big]$$

$$- F_3F_5\big[\cos\{8\theta + 3\beta + 5\gamma\} - \cos\{2\theta - 3\beta + 5\gamma\}\big] - F_3F_7\big[\cos\{10\theta + 3\beta + 7\delta\} - \cos\{4\theta - 3\beta + 7\delta\}\big] -$$

$$F_5F_7\big[\cos\{12\theta + 5\gamma + 7\delta\} - \cos\{2\theta - 5\gamma + 7\delta\}\big]$$

$$+ 2N\left(\begin{array}{l} -\dfrac{F_1I_1}{2}\{\cos(2\theta + \alpha + s) - \cos(\alpha - s)\} - \dfrac{F_3I_1}{2}[\cos\{4\theta + 3\beta + s\} - \cos\{2\theta + 3\beta - s\}] \\ -\dfrac{F_5I_1}{2}[\cos\{6\theta + 5\gamma + s\} - \cos\{4\theta + 5\gamma - s\}] - \dfrac{F_7I_1}{2}\big[\cos\{8\theta + 7\delta + s\} - \cos\{6\theta + 7\delta - s\}\big] \end{array}\right) +$$

$$N^2\left\{\frac{1}{2}I_1^2 - \frac{I_1^2}{2}\cos2(\theta + s)\right\}$$

Equation 8

V-phase excitation force $fv \propto$ $$\frac{1}{2}(F_1^2 + F_3^2 + F_5^2 + F_7^2) - \frac{F_1^2}{2}\cos2(\theta + \alpha - 120) - \frac{F_3^2}{2}\cos6(\theta + \beta - 120) - \frac{F_5^2}{2}\cos10(\theta + \gamma - 120) - \frac{F_7^2}{2}\cos14(\theta + \delta - 120)$$

$$- F_1F_3\big[\cos\{4\theta + \alpha + 3\beta - 480\} - \cos\{2\theta - \alpha + 3\beta - 240\}\big] - F_1F_5[\cos\{6\theta + \alpha + 5\gamma - 720\} - \cos\{4\theta - \alpha + 5\gamma - 480\}] -$$

$$F_1F_7\big[\cos\{8\theta + \alpha + 7\delta - 960\} - \cos\{6\theta - \alpha + 7\delta - 720\}\big]$$

$$- F_3F_5\big[\cos\{8\theta + 3\beta + 5\gamma - 960\} - \cos\{2\theta - 3\beta + 5\gamma - 240\}\big] - F_3F_7\big[\cos\{10\theta + 3\beta + 7\delta - 1200\} - \cos\{4\theta - 3\beta + 7\delta - 480\}\big] -$$

$$F_5F_7\big[\cos\{12\theta + 5\gamma + 7\delta - 1440\} - \cos\{2\theta - 5\gamma + 7\delta - 240\}\big]$$

$$+ 2N\left(\begin{array}{l} -\dfrac{F_1I_1}{2}\{\cos(2\theta + \alpha + s - 240) - \cos(\alpha - s)\} - \dfrac{F_3I_1}{2}[\cos\{4\theta + 3\beta + s - 480\} - \cos\{2\theta + 3\beta - s - 240\}] \\ -\dfrac{F_5I_1}{2}[\cos\{6\theta + 5\gamma + s - 720\} - \cos\{4\theta + 5\gamma - s - 480\}] - \dfrac{F_7I_1}{2}\big[\cos\{8\theta + 7\delta + s - 960\} - \cos\{6\theta + 7\delta - s - 720\}\big] \end{array}\right) +$$

$$N^2\left\{\frac{1}{2}I_1^2 - \frac{I_1^2}{2}\cos2(\theta + s - 120)\right\}$$

W-phase excitation force $f_w \propto$

Equation 9

$$\frac{1}{2}(F_1^2 + F_3^2 + F_5^2 + F_7^2) - \frac{F_1^2}{2}\cos2(\theta + \alpha - 240) - \frac{F_3^2}{2}\cos6(\theta + \beta - 240) - \frac{F_5^2}{2}\cos10(\theta + \gamma - 240) - \frac{F_7^2}{2}\cos14(\theta + \delta - 240)$$

$$- F_1F_3\left[\cos\{4\theta + \alpha + 3\beta - 960\} - \cos\{2\theta - \alpha + j\beta - 480\}\right] -$$

$$F_1F_5\left[\cos\{6\theta + \alpha + 5\gamma - 1440\} - \cos\{4\theta - \alpha + 5\gamma - 960\}\right] - F_1F_7\left[\cos\{8\theta + \alpha + 7\delta - 1920\} - \cos\{6\theta - \alpha + 7\delta - 1440\}\right]$$

$$- F_3F_5\left[\cos\{8\theta + 3\beta + 5\gamma - 1920\} - \cos\{2\theta - 3\beta + 5\gamma - 480\}\right] - F_3F_7\left[\cos\{10\theta + 3\beta + 7\delta - 2400\} - \cos\{4\theta - 3\beta + 7\delta - 960\}\right] -$$

$$F_5F_7\left[\cos\{12\theta + 5\gamma + 7\delta - 2880\} - \cos\{2\theta - 5\gamma + 7\delta - 480\}\right]$$

$$+ 2N\left(\begin{array}{c} -\dfrac{F_1I_1}{2}\left\{\cos(2\theta + \alpha + s - 480) - \cos(\alpha - s)\right\} - \dfrac{F_3I_1}{2}\left[\cos\{4\theta + 3\beta + s - 960\} - \cos\{2\theta + 3\beta - s - 480\}\right] \\ -\dfrac{F_5I_1}{2}\left[\cos\{6\theta + 5\gamma + s - 1440\} - \cos\{4\theta + 5\gamma - s - 960\}\right] - \dfrac{F_7I_1}{2}\left[\cos\{8\theta + 7\delta + s - 1920\} - \cos\{6\theta + 7\delta - s - 1440\}\right] \end{array}\right) +$$

$$N^2\left(\frac{1}{2}I_1^2 - \frac{I_1^2}{2}\cos2(\theta + s - 240)\right)$$

Here, Fi (i is a subscript) represents the amplitude of the ith harmonic of the rotor magnetomotive force, Ii represents the amplitude of the ith harmonic of the stator current, θ denotes the rotation angle of the rotor, and α, β, γ, δ, s, t, and u respectively denote phase angles. In the equations 7 to 9, the terms with solid underlines are the terms that are in phase in the respective phases, and the terms with dashed lines are the terms that are 120 degrees apart in phase between the respective phases. As the magnetic noise is caused by the resultant of the excitation forces of these phases, the following equation 10 is obtained by summing the equations 7 to 9.

$f_u + f_v + f_w \propto$  Equation 10

$$\frac{3}{2}(F_1^2 + F_3^2 + F_5^2 + F_7^2) +$$

$$\underbrace{3NF_1I_1\cos(\alpha - s) + \frac{3N^2}{2}I_1^2}_{(1)} -$$

$$\underbrace{\frac{3F_3^2}{2}\cos6(\theta + \beta)}_{(2)} - \underbrace{3F_1F_5\cos(6\theta + \alpha + 5\gamma)}_{(3)} +$$

$$\underbrace{3F_1F_7\cos(6\theta - \alpha + 7\delta)}_{(4)} - \underbrace{3F_5F_7\cos(12\theta + 5\gamma + 7\delta)}_{(5)} +$$

$$3N\left(-\underbrace{\frac{F_5I_1\cos(6\theta + 5\gamma + s)}{(6)}}_{} + \underbrace{\frac{F_7I_1\cos(6\theta + 7\delta - s)}{(7)}}_{}\right)$$

Term (1): DC component

Term (2): Sixth component occurring due to the third harmonic of the rotor magnetomotive force Term (3): Sixth component occurring due to the first and fifth harmonics of the rotor magnetomotive force Term (4): Sixth component occurring due to the first and seventh harmonics of the rotor magnetomotive force Term (5): 12th component occurring due to the fifth and seventh harmonics of the rotor magnetomotive force Term (6): Sixth component occurring due to the fifth harmonic of the rotor magnetomotive force and the first harmonic of the stator current Term (7): Sixth component occurring due to the seventh harmonic of the rotor magnetomotive force and the first harmonic of the stator current In the equation 10, the terms indicated by solid lines in the equations 7 to 9 are in phase and, therefore, reinforce each other, while the terms indicated by dashed lines in the equations 7 to 9 are the terms for which the vector sum between the three phases is zero, and these terms are therefore the canceling terms. That is, in the equation 10, the sixth components indicated at (2), (3), (4), (6), and (7) and the 12th component indicated at (5) are the reinforcing terms, and these contribute to the generation of the magnetic noise of the three-phase AC rotary electric machine. When calculations are performed with further detailed conditions, it is seen that the resultant excitation force of the three-phase AC rotary electric machine is an integral multiple of 6, that is, the harmonics of the magnetic noise have a 6kth-order component (k is a natural number).

Next, a description will be given of the case where two harmonic current components are superimposed on the fundamental frequency component (first component) of the stator current. An extremely important point here is that the mth harmonic current component has a reverse phase order from that of the fundamental frequency component, while the nth harmonic current component has the same phase order as that of the fundamental frequency component. To describe this more specifically, when the phase order of the fundamental frequency component is U, V, and W, the phase order of the mth harmonic current component is U, W, and V, and the phase order of the nth harmonic current component is U, V, and W.

For generalization, it is assumed that the rotor magnetomotive force has first, jth, kth, and lth harmonics. In this case, the rotor magnetomotive forces and stator currents for the respective phases are expressed by the following equations 11 to 13; here, by calculating the respective equations 11 to 13 in the same manner as earlier described, equations 14 to 16 are respectively obtained.

$Fi$ ... Amplitude of the $i$th harmonic of the rotor
$Ii$ ... Amplitude of the $i$th harmonic of the stator current U phase $\theta$ ... Rotation angle of the rotor
$\alpha, \beta, \gamma, \delta, s, t, u$ ... Constant angles
$j, k, L, m, n$ ... Integers Equation 11

$$\begin{cases} \text{Rotor magnetomotive force} & F_{mag} = \underbrace{F_1 \sin(\theta + \alpha)}_{\substack{\text{Fundamental} \\ \text{(first harmonic)}}} + \underbrace{F_j \sin j(\theta + \beta)}_{\substack{j\text{th} \\ \text{harmonic}}} + \underbrace{F_k \sin k(\theta + \gamma)}_{\substack{k\text{th} \\ \text{harmonic}}} + \underbrace{F_l \sin l(\theta + \delta)}_{\substack{L\text{th} \\ \text{harmonic}}} \\ \text{Stator current} & I_{coil} = \underbrace{I_1 \sin(\theta + s)}_{\substack{\text{Fundamental} \\ \text{(first harmonic)}}} + \underbrace{I_m \sin m(\theta + t)}_{\substack{m\text{th} \\ \text{harmonic}}} + \underbrace{I_n \sin n(\theta + u)}_{\substack{n\text{th} \\ \text{harmonic}}} \end{cases}$$

V phase

Equation 12

$$\begin{cases} \text{Rotor magnetomotive force} & F_{mag} = F_1\sin(\theta + \alpha - 120) + F_j\sin j(\theta + \beta - 120) + F_k\sin k(\theta + \gamma - 120) + F_l\sin l(\theta + \delta - 120) \\ \text{Stator current} & I_{coil} = I_1\sin(\theta + s - 120) + I_m\sin\{m(\theta + t) - 240\} + I_n\sin\{n(\theta + u) - 120\} \end{cases}$$

W phase

Equation 13

$$\begin{cases} \text{Rotor magnetomotive force} & F_{mag} = F_1\sin(\theta + \alpha - 240) + F_j\sin j(\theta + \beta - 240) + F_k\sin k(\theta + \gamma - 240) + F_l\sin l(\theta + \delta - 240) \\ \text{Stator current} & I_{coil} = I_1\sin(\theta + s - 240) + I_m\sin\{m(\theta + t) - 120\} + I_n\sin\{n(\theta + u) - 240\} \end{cases}$$

U-phase excitation force $fu \propto$ — $\underbrace{\text{Inphase term which, when vector summed between the three phases, contributes to producing reinforcement}}$ ... $\underbrace{\text{Term for which the vector sum between the three phases is zero}}$ Equation 14

$\frac{1}{2}(F_1^2 + F_j^2 + F_k^2 + F_l^2) - \frac{F_1^2}{2}\cos 2(\theta + \alpha) - \frac{F_j^2}{2}\cos 2j(\theta + \beta) - \frac{F_k^2}{2}\cos 2k(\theta + \gamma) - \frac{F_l^2}{2}\cos 2l(\theta + \delta)$
$- F_1 F_j[\cos\{(j+1)\theta + \alpha + j\beta\} - \cos\{(j-1)\theta - \alpha + j\beta\}] - F_1 F_k[\cos\{(k+1)\theta + \alpha + k\gamma\} -$
$\cos\{(k-1)\theta - \alpha + k\gamma - 120(k-1)\}]$
$- F_1 F_l[\cos\{(l+1)\theta + \alpha + l\delta - 120(l+1)\} - \cos\{(l-1)\theta - \alpha + l\delta - 120(l-1)\}] - F_j F_k[\cos\{(k+j)\theta + j\beta + k\gamma - 120(k-j)\} -$
$\cos\{(k-j)\theta - j\beta + k\gamma - 120(k-j)\}]$
$- F_1 F_l[\cos\{(l+j)\theta + j\beta + l\delta - 120(l+j)\} - \cos\{(l-j)\theta - j\beta + l\delta - 120(l-j)\}] - F_k F_l[\cos\{(l+k)\theta + k\gamma + l\delta - 120(l+k)\} -$
$\cos\{(l-k)\theta - k\gamma + l\delta - 120(l-k)\}]$ $+2N \begin{pmatrix} -\frac{F_1 I_1}{2}\{\underline{\cos(2\theta + \alpha + s)} - \cos(\alpha - s)\} - \\ \qquad \frac{F_1 I_m}{2}[\underline{\cos\{(m+1)\theta + \alpha + mt\}} - \underline{\cos\{(m-1)\theta - \alpha + mt\}}] \\ -\frac{F_1 I_n}{2}[\underline{\cos\{(n+1)\theta + \alpha + nu\}} - \underline{\cos\{(n-1)\theta - \alpha + nu\}}] - \\ \qquad \frac{F_j I_1}{2}[\cos\{(j+1)\theta + j\beta + s\} - \cos\{(j-1)\theta + j\beta - s\}] \\ -\frac{F_j I_m}{2}[\cos\{(j+m)\theta + j\beta + mt\} - \cos\{(j-m)\theta + j\beta - mt\}] - \\ \qquad \frac{F_j I_n}{2}[\cos\{(j+n)\theta + j\beta + nu\} - \cos\{(j-n)\theta + j\beta - nu\}] \\ -\frac{F_k I_1}{2}[\cos\{(k+1)\theta + k\gamma + s\} - \cos\{(k-1)\theta + k\gamma - s\}] - \\ \qquad \frac{F_k I_m}{2}[\cos\{(k+m)\theta + k\gamma + mt\} - \cos\{(k-m)\theta + k\gamma - mt\}] \\ -\frac{F_k I_n}{2}[\cos\{(k+n)\theta + k\gamma + nu\} - \cos\{(k-n)\theta + k\gamma - nu\}] - \\ \qquad \frac{F_l I_1}{2}[\cos\{(l+1)\theta + l\delta + s\} - \cos\{(l-1)\theta + l\delta - s\}] \\ -\frac{F_l I_m}{2}[\cos\{(l+m)\theta + l\delta + mt\} - \cos\{(l-m)\theta + l\delta - mt\}] - \\ \qquad \frac{F_l I_n}{2}[\cos\{(l+n)\theta + l\delta + nu\} - \cos\{(l-n)\theta + l\delta - nu\}] \end{pmatrix}$ $+N^2 \begin{pmatrix} \frac{1}{2}(I_1^2 + I_m^2 + I_n^2) - \frac{I_1^2}{2}\cos 2(\theta + s) - \frac{I_m^2}{2}\cos 2m(\theta + t) - \frac{I_n^2}{2}\cos 2n(\theta + u) - I_1 I_m[\underline{\cos\{(m+1)\theta + s + mt\}} - \underline{\cos\{(m-1)\theta - s + mt\}}] \\ -I_1 I_n[\underline{\cos\{(n+1)\theta + s + nu\}} - \underline{\cos\{(n-1)\theta - s + nu\}}] - I_m I_n[\underline{\cos\{(m+n)\theta + mt + nu\}} - \underline{\cos\{(m-n)\theta + mt - nu\}}] \end{pmatrix}$ -continued

| | | Inphase term which, when | Term for which the vector | Equation 15 |
|---|---|---|---|---|
| V-phase excitation force | $fv \propto$ — | vector summed between the three phases, contributes to producing reinforcement | ... sum between the three phases is zero | |

$\frac{1}{2}(F_1^2 + F_j^2 + F_k^2 + F_l^2) - \frac{F_1^2}{2}\cos 2(\theta + \alpha - 120) - \frac{F_j^2}{2}\cos 2j(\theta + \beta - 120) - \frac{F_k^2}{2}\cos 2k(\theta + \gamma - 120) - \frac{F_l^2}{2}\cos 2l(\theta + \delta - 120)$ $- F_1 F_j[\cos\{(j+1)\theta + \alpha + j\beta - 120(j+1)\} - \cos\{(j-1)\theta - \alpha + j\beta - 120(j-1)\}] - F_1 F_k[\cos\{(k+1)\theta + \alpha + k\gamma - 120(k+1)\} - \cos\{(k-1)\theta - \alpha + k\gamma - 120(k-1)\}]$ $- F_1 F_l[\cos\{(l+1)\theta + \alpha + l\delta\} - \cos\{(l-1)\theta - \alpha + l\delta\}] - F_j F_k[\cos\{(k+j)\theta + j\beta + k\gamma\} - \cos\{(k-j)\theta - j\beta + k\gamma\}]$ $- F_j F_l[\cos\{(l+j)\theta + j\beta + l\delta\} - \cos\{(l-j)\theta - j\beta + l\delta\}] - F_k F_l[\cos\{(l+k)\theta + k\gamma + l\delta\} - \cos\{(l-k)\theta - k\gamma + l\delta\}]$ $+2N\begin{pmatrix} -\frac{F_1 I_1}{2}\{\cos(2\theta + \alpha + s - 240) - \cos(\alpha - s)\} - \\ \frac{F_1 I_m}{2}[\cos\{(m+1)\theta + \alpha + mt\} - \cos\{(m-1)\theta - \alpha + mt - 120\}] \\ -\frac{F_1 I_n}{2}[\cos\{(n+1)\theta + \alpha + nu - 240\} - \cos\{(n-1)\theta - \alpha + nu\}] - \\ \frac{F_j I_1}{2}[\cos\{(j+1)\theta + j\beta + s - 120(j+1)\} - \cos\{(j-1)\theta + j\beta - s - 120(j-1)\}] \\ -\frac{F_j I_m}{2}[\cos\{(j+m)\theta + j\beta + mt - 120(j+2)\} - \cos\{(j-m)\theta + j\beta - mt - 120(j-2)\}] - \\ \frac{F_j I_n}{2}[\cos\{(j+n)\theta + j\beta + nu - 120(j+1)\} - \cos\{(j-n)\theta + j\beta - nu - 120(j-1)\}] \\ -\frac{F_k I_1}{2}[\cos\{(k+1)\theta + k\gamma + s - 120(5+1)\} - \cos\{(k-1)\theta + k\gamma - s - 120(k-1)\}] - \\ \frac{F_k I_m}{2}[\cos\{(k+m)\theta + k\gamma + mt - 120(k+2)\} - \cos\{(k-m)\theta + k\gamma - mt - 120(k-2)\}] \\ -\frac{F_k I_n}{2}[\cos\{(k+n)\theta + k\gamma + nu - 120(k+1)\} - \cos\{(k-n)\theta + k\gamma - nu - 120(k-1)\}] - \\ \frac{F_l I_1}{2}[\cos\{(l+1)\theta + l\delta + s - 120(l+1)\} - \cos\{(l-1)\theta + l\delta - s - 120(l-1)\}] \\ -\frac{F_l I_m}{2}[\cos\{(l+m)\theta + l\delta + mt - 120(l+2)\} - \cos\{(l-m)\theta + l\delta - mt - 120(l-2)\}] - \\ \frac{F_l I_n}{2}[\cos\{(l+n)\theta + l\delta + nu - 120(l+1)\} - \cos\{(l-n)\theta + l\delta - nu - 120(l-1)\}] \end{pmatrix}$ $\begin{pmatrix} \frac{1}{2}(I_1^2 + I_m^2 + I_n^2) - \frac{I_1^2}{2}\cos 2(\theta + s - 120) - \frac{I_m^2}{2}\cos\{2m(\theta + t) - 120\} - \frac{I_n^2}{2}\cos\{2n(\theta + u) - 240\} - \\ I_1 I_m[\cos\{(m+1)\theta + s + mt\} - \cos\{(m-1)\theta - s + mt - 120\}] \\ -I_1 I_n[\cos\{(n+1)\theta + s + nu - 240\} - \cos\{(n-1)\theta - s + nu\}] - I_m I_n[\cos\{(m+n)\theta + mt + nu\} - \\ I_m I_n[\cos\{(m+n)\theta + mt + nu\} - \cos\{(m-n)\theta + mt - nu - 120\}] \end{pmatrix}$

| | | Inphase term which, when | Term for which the vector | Equation 16 |
|---|---|---|---|---|
| W-phase excitation force | $fw \propto$ — | vector summed between the three phases, contributes to producing reinforcement | ... sum between the three phases is zero | |

$\frac{1}{2}(F_1^2 + F_j^2 + F_k^2 + F_l^2) - \frac{F_1^2}{2}\cos 2(\theta + \alpha - 240) - \frac{F_j^2}{2}\cos 2j(\theta + \beta - 240) - \frac{F_k^2}{2}\cos 2k(\theta + \gamma - 240) - \frac{F_l^2}{2}\cos 2l(\theta + \delta - 240)$ $- F_1 F_j[\cos\{(j+1)\theta + \alpha + j\beta - 240(j+1)\} - \cos\{(j-1)\theta - \alpha + j\beta - 240(j-1)\}] -$ $F_1 F_k[\cos\{(k+1)\theta + \alpha + k\gamma - 240(k+1)\} - \cos\{(k-1)\theta - \alpha + k\gamma - 240(k-1)\}]$ $- F_1 F_l[\cos\{(l+1)\theta + \alpha + l\delta - 240(l+1)\} - \cos\{(l-1)\theta - \alpha + l\delta - 240(l-1)\}] -$ $F_j F_k[\cos\{(k+j)\theta + j\beta + k\gamma - 240(k+j)\} - \cos\{(k-j)\theta - j\beta + k\gamma - 240(k-j)\}]$ $- F_j F_l[\cos\{(l+j)\theta + j\beta + l\delta - 240(l+j)\} - \cos\{(l-j)\theta - j\beta + l\delta - 240(l-j)\}] -$ $F_k F_l[\cos\{(l+k)\theta + k\gamma + l\delta - 240\} - \cos\{(l-k)\theta - k\gamma + l\delta - 240(l-k)\}]$ -continued $$+2N\begin{pmatrix} -\dfrac{F_1I_1}{2}\{\cos(2\theta+\alpha+s-480)-\cos(\alpha-s)\}-\dfrac{F_1I_m}{2}[\cos\{(m+1)\theta+\alpha+mt\}-\\ \cos\{(m-1)\theta-\alpha+mt+120\}] \\ -\dfrac{F_1I_n}{2}[\cos\{(n+1)\theta+\alpha+nu-120\}-\cos\{(n-1)\theta-\alpha+nu\}]- \\ \dfrac{F_jI_1}{2}[\cos\{(j+1)\theta+j\beta+s+240(j+1)\}-\cos\{(j-1)\theta+j\beta-s-240(j-1)\}] \\ -\dfrac{F_jI_m}{2}[\cos\{(j+m)\theta+j\beta+mt-120(2j+1)\}-\cos\{(j-m)\theta+j\beta-mt-120(2j-1)\}]- \\ \dfrac{F_jI_n}{2}[\cos\{(j+n)\theta+j\beta+nu-240(j+1)\}-\cos\{(j-n)\theta+j\beta-nu-240(j-1)\}] \\ \dfrac{F_kI_1}{2}[\cos\{(k+1)\theta+k\gamma+s-240(k+1)\}-\cos\{(k-1)\theta+k\gamma-s-240(k-1)\}]- \\ -\dfrac{F_kI_m}{2}[\cos\{(k+m)\theta+k\gamma+mt-120(2k+1)\}-\cos\{(k-m)\theta+k\gamma-mt-120(2k-1)\}] \\ \dfrac{F_kI_n}{2}[\cos\{(k+n)\theta+k\gamma+nu-240(k+1)\}-\cos\{(k-n)\theta+k\gamma-nu-240(k-1)\}]- \\ \dfrac{F_lI_1}{2}[\cos\{(l+1)\theta+l\delta+s-240(l+1)\}-\cos\{(l-1)\theta+l\delta-s-240(l-1)\}] \\ -\dfrac{F_lI_m}{2}[\cos\{(l+m)\theta+l\delta+mt-120(2l+1)\}-\cos\{(l-m)\theta+l\delta-mt-120(2l-1)\}]- \\ \dfrac{F_lI_n}{2}[\cos\{(l+n)\theta+l\delta+nu-240(l+1)\}-\cos\{(l-n)\theta+l\delta-nu-240(l-1)\}]+2N \end{pmatrix}$$

$$+N^2\begin{pmatrix} \dfrac{1}{2}(I_1^2+I_m^2+I_n^2)-\dfrac{I_1^2}{2}\cos2(\theta+s-240)-\dfrac{I_m^2}{2}\cos\{2m(\theta+t)-240\}- \\ \dfrac{I_n^2}{2}\cos\{2n(\theta+u)-120\}-I_1I_m\big[\cos\{(m+1)\theta+s+mt\}-\cos\{(m-1)\theta-s+mt+120\}\big] \\ -I_1I_n\big[\cos\{(n+1)\theta+s+nu-120\}-\cos\{(n-1)\theta-s+nu\}\big]- \\ I_mI_n\big[\cos\{(m+n)\theta+mt+nu\}-\cos\{(m-n)\theta+mt-nu+120\}\big] \end{pmatrix}$$

In the equations 14 to 16, the terms with solid underlines are the terms that are in phase in the respective phases, and the terms with dashed lines are the terms that are 120 degrees apart in phase between the respective phases. The magnetic noise is caused by the resultant of the excitation forces of these phases. That is, it can be seen that when the mth harmonic current component of the reverse phase order and the nth harmonic current component of the normal phase order are added, excitation forces of the (m+1)th, (n−1)th, and (m+n)th orders can be generated.

More specifically, with the mth and nth harmonic current components, excitation forces of the (m+1)th, (n+1)th, and (m−n)th orders can be generated at will, and thus the magnetic noise can be increased or reduced as desired.

Using the above analytical results, a study will be given of the case where harmonic current components of order 5 in the reverse phase order and order 7 in the normal phase order are superimposed in order to reduce the sixth- and 12th-order magnetic noise that becomes a problem in the three-phase AC rotary electric machine.

In the equations 11 to 13, consider the case where j =3, k=5, l=7, m=5, and n=7, which mean the first, third, fifth, and seventh harmonics of the rotor magnetomotive force and the fifth (reverse phase order) and seventh (normal phase order) harmonics of the stator current; then, the rotor magnetomotive forces and stator currents for the respective phases are expressed by equations 17, 18, and 19 below.

Equation 17

U phase $$\begin{cases} \text{Rotor magnetomotive force} \quad F_{mag} = \underbrace{F_1\sin(\theta+\alpha)}_{\substack{\text{Fundamental}\\\text{(first harmonic)}}}+\underbrace{F_3\sin3(\theta+\beta)}_{\text{3rd harmonic}}+\underbrace{F_5\sin5(\theta+\gamma)}_{\text{5th harmonic}}+\underbrace{F_7\sin7(\theta+\delta)}_{\text{7th harmonic}} \\ \text{Stator current} \quad I_{coil} = \underbrace{I_1\sin(\theta+s)}_{\substack{\text{Fundamental}\\\text{(first harmonic)}}}+\underbrace{I_5\sin5(\theta+t)}_{\text{5th harmonic}}+\underbrace{I_7\sin7(\theta+u)}_{\text{7th harmonic}} \end{cases}$$

-continued

V phase    Equation 18

$$\begin{cases} \text{Rotor magnetomotive force} & F_{mag} = F_1\sin(\theta+\alpha-120) + F_3\sin 3(\theta+\beta-120) + \\ & F_5\sin 5(\theta+\gamma-120) + F_7\sin 7(\theta+\delta-120) \\ \text{Stator current} & I_{coil} = I_1\sin(\theta+s-120) + I_5\sin\{5(\theta+t)-240\} + I_7\sin\{7(\theta+u)-120\} \end{cases}$$

W phase    Equation 19

$$\begin{cases} \text{Rotor magnetomotive force} & F_{mag} = F_1\sin(\theta+\alpha-240) + F_3\sin 3(\theta+\beta-240) + \\ & F_5\sin 5(\theta+\gamma-240) + F_7\sin 7(\theta+\delta-240) \\ \text{Stator current} & I_{coil} = I_1\sin(\theta+s-240) + I_5\sin\{5(\theta+t)-120\} + I_7\sin\{7(\theta+u)-240\} \end{cases}$$

Calculating these equations in the same manner as earlier described, the excitation forces for the respective phases are given by equations 20 to 22 below, and the excitation force resulting from the sum of the excitation forces for the respective phases is expressed by equation 23.

Equation 20

$$\begin{array}{l} U\text{-phase} \\ \text{excitation force} \end{array} fu \propto \;-\; \begin{array}{l}\text{Inphase term which, when}\\ \text{vector summed between the}\\ \text{three phases, contributes}\\ \text{to producing reinforcement}\end{array} \;\ldots\; \begin{array}{l}\text{Term for which the vector}\\ \text{sum between the three}\\ \text{phases is zero}\end{array}$$

$$\frac{1}{2}(F_1^2 + F_3^2 + F_5^2 + F_7^2) - \frac{F_1^2}{2}\cos 2(\theta+\alpha) - \frac{F_3^2}{2}\cos 6(\theta+\beta) - \frac{F_5^2}{2}\cos 10(\theta+\gamma) - \frac{F_7^2}{2}\cos 14(\theta+\delta)$$

$$- F_1 F_3 \left[\cos\{4\theta+\alpha+3\beta\} - \cos\{2\theta-\alpha+3\beta\}\right] - F_1 F_5 \left[\cos\{6\theta+\alpha+5\gamma\} - \cos\{4\theta-\alpha+5\gamma\}\right]$$

$$- F_1 F_7 \left[\cos\{8\theta+\alpha+7\delta\} - \cos\{6\theta-\alpha+7\delta\}\right] - F_3 F_5 [\cos\{8\theta+3\beta+5\gamma\} - \cos\{2\theta-3\beta+5\gamma\}]$$

$$- F_3 F_7 [\cos\{10\theta+3\beta+7\delta\} - \cos\{4\theta-3\beta+7\delta\}] - F_5 F_7 \left[\cos\{12\theta+5\gamma+7\delta\} - \cos\{2\theta-5\gamma+7\delta\}\right]$$

$$+2N\left(\begin{array}{l} -\dfrac{F_1 I_1}{2}\{\cos(2\theta+\alpha+s)-\cos(\alpha-s)\} - \dfrac{F_1 I_5}{2}\left[\cos\{6\theta+\alpha+5t\}-\cos\{4\theta-\alpha+5t\}\right] \\ -\dfrac{F_1 I_7}{2}\left[\cos\{8\theta+\alpha+7u\}-\cos\{6\theta-\alpha+7u\}\right] - \dfrac{F_3 I_1}{2}\left[\cos\{4\theta+3\beta+s\}-\cos\{2\theta+3\beta-s\}\right] \\ -\dfrac{F_3 I_5}{2}[\cos\{8\theta+3\beta+5t\}-\cos\{2\theta-3\beta+5t\}] - \dfrac{F_3 I_7}{2}[\cos\{10\theta+3\beta+7u\}-\cos\{4\theta-3\beta+7u\}] \\ -\dfrac{F_5 I_1}{2}\left[\cos\{6\theta+5\gamma+s\}-\cos\{4\theta+5\gamma-s\}\right] - \dfrac{F_5 I_5}{2}\left[\cos\{10\theta+5\gamma+5t\}-\cos\{5\gamma-5t\}\right] \\ -\dfrac{F_5 I_7}{2}\left[\cos\{12\theta+5\gamma+7u\}-\cos\{2\theta-5\gamma+7u\}\right] - \dfrac{F_7 I_1}{2}\left[\cos\{8\theta+7\delta+s\}-\cos\{6\theta+7\delta-s\}\right] \\ -\dfrac{F_7 I_5}{2}\left[\cos\{12\theta+7\delta+5t\}-\cos\{2\theta-7\delta-5t\}\right] - \dfrac{F_7 I_7}{2}[\cos\{14\theta+7\delta+7u\}-\cos\{7\delta-7u\}] \end{array}\right)$$

$$+N^2\left(\begin{array}{l} \dfrac{1}{2}(I_1^2+I_5^2+I_7^2) - \dfrac{I_1^2}{2}\cos 2(\theta+s) - \dfrac{I_5^2}{2}\cos 10(\theta+t) - \dfrac{I_7^2}{2}\cos 14(\theta+u) - I_1 I_5\left[\cos\{6\theta+s+5t\}-\cos\{4\theta-s+5t\}\right] \\ -I_1 I_7\left[\cos\{8\theta+s+7u\}-\cos\{6\theta-s+7u\}\right] - I_5 I_7\left[\cos\{12\theta+5t+7u\}-\cos\{2\theta-5t+7u\}\right] \end{array}\right)$$

Equation 21

W-phase excitation force $fw \propto$ —

| | |
|---|---|
| Inphase term which, when vector summed between the three phases, contributes to producing reinforcement | Term for which the vector sum between the three phases is zero |

$\frac{1}{2}(F_1^2 + F_3^2 + F_5^2 + F_7^2) - \frac{F_1^2}{2}\cos 2(\theta + \alpha - 120) - \frac{F_3^2}{2}\cos 6(\theta + \beta - 120) - \frac{F_5^2}{2}\cos 10(\theta + \gamma - 120) - \frac{F_7^2}{2}\cos 14(\theta + \delta - 120)$ $- F_1F_3\left[\cos\{4\theta + \alpha + 3\beta - 120\} - \cos\{2\theta - \alpha + 3\beta - 240\}\right] - F_1F_5\left[\cos\{6\theta + \alpha + 5\gamma\} - \cos\{4\theta - \alpha + 5\gamma - 120\}\right]$ $- F_1F_7\left[\cos\{8\theta + \alpha + 7\delta - 240\} - \cos\{6\theta - \alpha + 7\delta\}\right] - F_3F_5\left[\cos\{8\theta + 3\beta + 5\gamma - 240\} - \cos\{2\theta - 3\beta + 5\gamma - 240\}\right]$ $- F_3F_7\left[\cos\{10\theta + 3\beta + 7\delta - 120\} - \cos\{4\theta - 3\beta + 7\delta - 120\}\right] - F_5F_7\left[\cos\{12\theta + 5\gamma + 7\delta\} - \cos\{2\theta - 5\gamma + 7\delta - 240\}\right]$ $+ 2N \begin{pmatrix} -\frac{F_1I_1}{2}\{\cos(2\theta + \alpha + s - 480) - \cos(\alpha - s)\} - \frac{F_1I_5}{2}[\cos\{6\theta + \alpha + 5t\} - \cos\{4\theta - \alpha + 5t + 120\}] \\ -\frac{F_1I_7}{2}[\cos(8\theta + \alpha + 7u - 120) - \cos\{6\theta - \alpha + 7u\}] - \frac{F_3I_1}{2}[\cos\{4\theta + 3\beta + s - 240\} - \cos\{2\theta + 3\beta - s - 120\}] \\ -\frac{F_3I_3}{2}[\cos\{8\theta + 3\beta + 5t - 120\} - \cos\{2\theta - 3\beta + 5t + 240\}] - \\ \quad\quad\quad\quad -\frac{F_3I_7}{2}[\cos\{10\theta + 3\beta + 7u - 240\} - \cos\{4\theta - 3\beta + 7u + 120\}] \\ -\frac{F_5I_1}{2}[\cos\{6\theta + 5\gamma + s\} - \cos\{4\theta + 5\gamma - s - 240\}] - \frac{F_5I_5}{2}[\cos\{10\theta + 5\gamma + 5t - 240\} - \cos\{5\gamma - 5t\}] \\ -\frac{F_5I_7}{2}[\cos\{12\theta + 5\gamma + 7u\} - \cos\{2\theta + 5\gamma - 7u - 240\}] - \frac{F_1I_1}{2}[\cos\{8\theta + 7\delta + s - 120\} - \cos\{6\theta + 7\delta - s\}] \\ -\frac{F_7I_5}{2}[\cos\{12\theta + 7\delta + 5t\} - \cos\{2\theta + 7\delta - 5t - 120\}] - \frac{F_7I_7}{2}[\cos\{14\theta + 7\delta + 7u - 120\} - \cos\{7\delta - 7u\}] \end{pmatrix}$ $+ N^2 \begin{pmatrix} \frac{1}{2}(I_1^2 + I_5^2 + I_7^2) - \frac{I_1^2}{2}\cos 2(\theta + s - 120) - \frac{I_5^2}{2}\cos\{10(\theta + t) - 120\} - \frac{I_7^2}{2}\cos\{14(\theta + u) - 240\} - \\ I_1I_5\left[\cos\{6\theta + s + 5t\} - \cos\{4\theta - s + 5t - 120\}\right] \\ -I_1I_7\left[\cos\{8\theta + s + 7u - 240\} - \cos\{6\theta - s + 7u\}\right] - I_5I_7\left[\cos\{12\theta + 5t + 7u\} - \cos\{2\theta - 5t + 7u - 120\}\right] \end{pmatrix}$ -continued Equation 22

W-phase excitation force $fw \propto$ — Inphase term which, when vector summed between the three phases, contributes to producing reinforcement ... Term for which the vector sum between the three phases is zero $$\frac{1}{2}(F_1^2 + F_3^2 + F_5^2 + F_7^2) - \frac{F_1^2}{2}\cos 2(\theta + \alpha - 240) - \frac{F_3^2}{2}\cos 6(\theta + \beta - 240) - \frac{F_5^2}{2}\cos 10(\theta + \gamma - 240) - \frac{F_7^2}{2}\cos 14(\theta + \delta - 240)$$

$$- F_1 F_3 \left[\cos\{4\theta + \alpha + 3\beta - 240\} - \cos\{2\theta - \alpha + 3\beta - 120\}\right] - F_1 F_5 \left[\cos\{6\theta + \alpha + 5\gamma\} - \cos\{4\theta - \alpha + 5\gamma - 240\}\right]$$

$$- F_1 F_7 \left[\cos\{8\theta + \alpha + 7\delta - 120\} - \cos\{6\theta - \alpha + 7\delta\}\right] - F_3 F_5 \left[\cos\{8\theta + 3\beta + 5\gamma - 120\} - \cos\{2\theta - 3\beta + 5\gamma - 120\}\right]$$

$$- F_3 F_7 \left[\cos\{10\theta + 3\beta + 7\delta - 240\} - \cos\{4\theta - 3\beta + 7\delta - 240\}\right] - F_5 F_7 \left[\cos\{12\theta + 5\gamma + 7\delta\} - \cos\{2\theta - 5\gamma + 7\delta - 120\}\right]$$

$$+2N \begin{pmatrix} -\frac{F_1 I_1}{2}\{\cos(2\theta + \alpha + s - 480) - \cos(\alpha - s)\} - \frac{F_1 I_5}{2}[\cos\{6\theta + \alpha + 5t\} - \cos\{4\theta - \alpha + 5t + 120\}] \\ -\frac{F_1 I_7}{2}[\cos\{8\theta + \alpha + 7u - 120\} - \cos\{6\theta - \alpha + 7u\}] - \frac{F_3 I_1}{2}[\cos\{4\theta + 3\beta + s - 240\} - \cos\{2\theta + 3\beta - s - 120\}] \\ -\frac{F_3 I_5}{2}[\cos\{8\theta + 3\beta + 5t - 120\} - \cos\{2\theta - 3\beta + 5t + 240\}] - \frac{F_3 I_7}{2}[\cos\{10\theta + 3\beta + 7u - 240\} - \cos\{4\theta - 3\beta + 7u + 120\}] \\ -\frac{F_5 I_1}{2}[\cos\{6\theta + 5\gamma + s\} - \cos\{4\theta + 5\gamma - s - 240\}] - \frac{F_5 I_5}{2}[\cos\{10\theta + 5\gamma + 5t - 240\} - \cos\{5\gamma - 5t\}] \\ -\frac{F_5 I_7}{2}[\cos\{12\theta + 5\gamma + 7u\} - \cos\{2\theta - 5\gamma + 7u + 240\}] - \frac{F_7 I_1}{2}[\cos\{8\theta + 7\delta + s - 120\} - \cos\{6\theta + 7\delta - s\}] \\ -\frac{F_7 I_5}{2}[\cos\{12\theta + 7\delta + 5t\} - \cos\{2\theta + 7\delta - 5t - 120\}] - \frac{F_7 I_7}{2}[\cos\{14\theta + 7\delta + 7u - 120\} - \cos\{7\delta - 7u\}] \end{pmatrix}$$

$$+N^2 \begin{pmatrix} \frac{1}{2}(I_1^2 + I_5^2 + I_7^2) - \frac{I_1^2}{2}\cos 2(\theta + s - 240) - \frac{I_5^2}{2}\cos\{10(\theta + t) - 240\} - \\ \frac{I_7^2}{2}\cos\{14(\theta + u) - 120\} - I_1 I_5[\cos\{6\theta + s + 5t\} - \cos\{4\theta - s + 5t + 120\}] \\ -I_1 I_7[\cos\{8\theta + s + 7u - 120\} - \cos\{6\theta - s + 7u\}] - I_5 I_7[\cos\{12\theta + 5t + 7u\} - \cos\{2\theta - 5t + 7u + 120\}] \end{pmatrix}$$

Equation 23

$fu + fv + vw \propto$ $$\underbrace{\frac{3}{2}(F_1^2 + F_3^2 + F_5^2 + F_7^2) + \frac{3}{2}N^2(I_1^2 + I_5^2 + I_7^2) + 3NF_1 I_1 \cos(\alpha - s) + 3NF_5 I_5 \cos(5\gamma - 5t) + 3NF_7 I_7 \cos\{7\delta - 7u\}}_{(1)}$$

$$\underbrace{-\frac{3F_3^2}{2}\cos 6(\theta + \beta)}_{(2)} - \underbrace{\frac{3F_1 F_5[\cos\{6\theta + \alpha + 5\gamma\}]}{(3)}}_{(3)} + \underbrace{\frac{3F_1 F_7[\cos\{6\theta - \alpha + 7\delta\}]}{(4)}}_{(4)} - \underbrace{\frac{3F_5 F_7[\cos\{12\theta + 5\gamma + 7\delta\}]}{(5)}}_{(5)}$$

$$+2N \begin{pmatrix} -\underbrace{\frac{3F_1 I_5}{2}[\cos\{6\theta + \alpha + 5t\}]}_{(8)} + \underbrace{\frac{3F_1 I_7}{2}[\cos\{6\theta - \alpha + 7u\}]}_{(9)} - \underbrace{\frac{3F_5 I_1}{2}[\cos\{6\theta + 5\gamma + s\}]}_{(6)} \\ -\underbrace{\frac{3F_5 I_7}{2}[\cos\{12\theta + 5\gamma + 7u\}]}_{(10)} + \underbrace{\frac{3F_7 I_1}{2}[\cos\{6\theta + 7\delta - s\}]}_{(7)} - \underbrace{\frac{3F_7 I_5}{2}[\cos\{12\theta + 7\delta + 5t\}]}_{(11)} \end{pmatrix}$$

$$+N^2 \underbrace{\frac{\langle -3I_1 I_5[\cos\{6\theta + s + 5t\}] \rangle}{(12)}}_{} + \underbrace{\frac{3I_1 I_7[\cos\{6\theta - s + 7u\}]}{(13)}}_{} - \underbrace{\frac{3I_5 I_7[\cos\{12\theta + 5t + 7u\}]}{(14)}}_{}$$

Term (1): DC component

Term (2): Sixth component occurring due to the third harmonic of the rotor magnetomotive force Term (3): Sixth component occurring due to the first and fifth harmonics of the rotor magnetomotive force Term (4): Sixth component occurring due to the first and seventh harmonics of the rotor magnetomotive force Term (5): 12th component occurring due to the fifth and seventh harmonics of the rotor magnetomotive force Term (6): Sixth component occurring due to the fifth harmonic of the rotor magnetomotive force and the first harmonic of the stator current Term (7): Sixth component occurring due to the seventh harmonic of the rotor magnetomotive force and the first harmonic of the stator current Terms occurring when the fifth and seventh harmonics of the stator current are superimposed Term (8): Sixth component occurring due to the first harmonic of the rotor magnetomotive force and the fifth harmonic of the stator current Term (9): Sixth component occurring due to the first harmonic of the rotor magnetomotive force and the seventh harmonic of the stator current Term (10): 12th component occurring due to the fifth harmonic of the rotor magnetomotive force and the seventh harmonic of the stator current Term (11): 12th component occurring due to the seventh harmonic of the rotor magnetomotive force and the fifth harmonic of the stator current Term (12): Sixth component occurring due to the first and fifth harmonics of the stator current Term (13): Sixth component occurring due to the first and seventh harmonics of the stator current Term (14): 12th component occurring due to the fifth and seventh harmonics of the stator current vibration), that becomes a problem in the three-phase AC rotary electric machine, can be controlled. For example, in the equation 23, the magnitudes and phases of the harmonic current components of order 5 in reverse phase order and order 7 in normal phase order should be determined so that the amplitudes of the sixth- and 12th-order excitation forces can be minimized. Alternatively, either one of the excitation forces may be preferentially held within a tolerable range, while minimizing the other excitation force.

The conditions for the harmonic current components of order 5 in reverse phase order and order 7 in normal phase order are shown in equation 24 below for the case where the sixth-order excitation force is reduced to zero.

Cancellation of the sixth component  Equation 24

Vector sum of the magnetic noise terms$((2) + (3) + (4) + (6) + (7))$ +

Vector sum of the canceling terms$((8) + (9) + (12) + (13)) = 0$ $$-\frac{3F_3^2}{2}\cos 6(\theta + \beta) - 3F_1F_5[\cos\{6\theta + \alpha + 5\gamma\}] + 3F_1F_7[\cos(6\theta - \alpha + 7\delta)] - 3NF_5I_1[\cos\{6\theta + 5\gamma + s\}] + 3NF_7I_1[\cos\{6\theta + 7\delta - s\}]$$

Vector sum of magnetic noise terms $$+2N\left\{-\frac{3F_1I_5}{2}[\cos\{6\theta + \alpha + 5t\}] + \frac{3F_1I_7}{2}[\cos\{6\theta - \alpha + 7u\}]\right\} + N^2\langle -3I_1I_5[\cos\{6\theta + s + 5t\}] + 3I_1I_7[\cos\{6\theta - s + 7u\}]\rangle$$

Canceling terms

From a comparison between the equation 10 defining the resultant excitation force when no harmonic current components are superimposed and the equation 23 defining the resultant excitation force when harmonic current components are superimposed, it can be seen that, apart from the sixth and 12th components of the excitation force occurring in the equation 10, the sixth and 12th components of the excitation force are newly generated by the superimposition of the harmonic current components of order 5 in reverse phase order and order 7 in normal phase order.

This shows that, by adjusting the amplitudes and phases of the harmonic current components of order 5 in reverse phase order and order 7 in normal phase order, the magnitude of the sixth- and 12th-order magnetic noise (radial In the equation 24, the amplitude and phase of the harmonic current components should be set so as to make the sum of the magnetic noise terms and canceling terms equal to zero. The conditions for the harmonic current components of order 5 in reverse phase order and order 7 in normal phase order are shown in equation 25 below for the case where the 12th-order excitation force is reduced to zero.

Cancellation of the 12th component  Equation 25

Vector sum of the magnetic noise terms$(5)$ + Vector sum of the canceling terms$((10) + (11) + (14)) = 0$ $$-3F_5F_7[\cos\{12\theta + 5\gamma + 7\delta\}]$$

Vector sum of magnetic noise terms $$+2N\left\{-\frac{3F_1I_5}{2}[\cos\{6\theta + \alpha + 5t\}] + \frac{3F_1I_7}{2}[\cos\{6\theta - \alpha + 7u\}]\right\} + N^2\langle -3I_1I_5[\cos\{6\theta + s + 5t\}] + 3I_1I_7[\cos\{6\theta - s + 7u\}]\rangle$$

Canceling terms

In the equation 25, the amplitude and phase of the harmonic current components should be set so as to make the sum of the magnetic noise terms and canceling terms equal to zero.

(Modified Mode 1)

The above mathematical equations have been shown for the case of a three-phase AC rotary electric machine but, for other phase AC rotary electric machines also, similar calculation results can be obtained using the same method. Further, the above mathematical equations have been described by assuming the case where the rotor magnetomotive force contains the first, third, fifth, and seventh harmonics and the harmonic current components of order 5 in reverse phase order and order 7 in normal phase order are superimposed on the fundamental frequency component (first component) of the stator current, but it will be appreciated that the present invention is not limited to this particular case. For example, the rotor magnetomotive force may further contain the ninth and 11th harmonics, or the rotor magnetomotive force may contain the first, third, and fifth harmonics or the first, third, and seventh harmonics. Further, the reduction or modification of the sixth and 12th harmonics of the magnetic noise has been achieved in the above method, but it is also possible to modify the 18th, 24th, and other harmonics in a like manner.

A first important point of the present invention is that when an xth harmonic current component having a reverse phase order from that of the fundamental frequency component (first component) of the stator current is superimposed on the fundamental frequency component, an excitation force of order equal to (1–the order of the harmonic current component) can be generated. That is, by superimposing the xth harmonic current component having the reverse phase order, an excitation force of order $(1-(-x))=1+x$ can be generated. Here, the xth harmonic current component having the reverse phase order is a harmonic current component having a –xth harmonic order when viewed from the phase order of the fundamental frequency component. More specifically, as the excitation force has a harmonic order equal to the difference between the harmonic orders of a plurality of frequency currents, when the xth harmonic current component having the reverse phase order is added to the fundamental frequency component of the stator current, an excitation force of order x+1, which is equal to the difference between the harmonic orders of the two components, is generated. The concept that an (n–1)th harmonic current having a suitable phase and amplitude should be superimposed in reverse phase order, if the nth magnetic noise of an AC rotary electric machine is to be increased or reduced, has not been known at all in the prior art, and this concept plays a very important role in the future development of low-noise motors. To describe this further, as the excitation force has a harmonic order equal to the difference between the harmonic orders of a plurality of frequency currents, when the xth harmonic current component having the reverse phase order is added to the fundamental frequency component of the stator current, an excitation force of order x+1, which is equal to the difference between the harmonic orders of the two components, is generated.

Similarly, when a yth harmonic current component having the same phase order as that of the fundamental frequency component (first component) of the stator current is superimposed on the fundamental frequency component, an excitation force of order equal to (the harmonic order of the harmonic current component –1) can be generated. That is, by superimposing the yth harmonic current component having the same phase order, an excitation force of order (y–1) can be generated. More specifically, as the excitation force has a harmonic order equal to the difference between the harmonic orders of a plurality of frequency currents, when the yth harmonic current component having the same phase order is added to the fundamental frequency component of the stator current, an excitation force of order (y–1), which is equal to the difference between the harmonic orders of the two components, is generated. The concept that an (n–1)th harmonic current having a suitable phase and amplitude should be superimposed in the same phase order, if the nth magnetic noise of an AC rotary electric machine is to be increased or reduced, has not been known at all in the prior art, and this concept plays a very important role in the future development of low-noise motors. Further, the concept that the (m–1)th, (n–1)th, and (m–n)th magnetic excitation force components can be simultaneously modified (increased or reduced) by superimposing the mth and nth harmonic current components having the normal phase order on the fundamental frequency component has also be unknown in the prior art, and, by using this concept, a plurality of excitation force components can be adjusted by adjusting the amplitudes and phases of the mth and nth harmonic current components to be superimposed.

When the harmonic current components of order 5 in the reverse phase order and order 7 in the normal phase order are superimposed as described above, it can be considered that the sixth-order excitation force is generated due to the presence of the fifth harmonic current component of the reverse phase order and the fundamental frequency component (first component), the sixth-order excitation force is generated due to the presence of the seventh harmonic current component of the normal phase order and the fundamental frequency component, and the 12th-order excitation force is generated due to the presence of the fifth harmonic current component of the reverse phase order and the seventh harmonic current component of the normal phase order. That is, by superimposing the fifth harmonic current component of the reverse phase order and the seventh harmonic current component of the normal phase order, two kinds of excitation forces, i.e., the sixth- and 12th-order excitation forces, can be generated (preferably, reduced), whereas when each harmonic current component is superimposed separately, only the sixth-order excitation force can be generated.

More specifically, when the mth harmonic current component of the reverse phase order and the nth harmonic current component of the normal phase order are superimposed on the fundamental frequency component of the stator current, the (m+1)th, (n–1)th, and (n+m)th magnetic excitation force components can be generated. Compared with the magnetic noise reduction method previously described by the present applicant in which a harmonic current component having a harmonic order higher by 1 than the prescribed harmonic order of the excitation force is superimposed on the fundamental frequency component, the method described herein not only can greatly reduce the harmonic order, i.e., the frequency, of the harmonic current component to be superimposed, but facilitates its generation and control; this also constitutes an important advantage of the present invention. To describe this more specifically, by way of an example, when superimposing only harmonic current components of normal phase order, the seventh and 13th harmonic current components must be superimposed, for example, to reduce the sixth and 12th components of the magnetic noise. Similarly, when superimposing only harmonic current components of reverse phase order, the fifth and 11th harmonic current components must be superimposed. In contrast, according to the present invention, by superimposing both the harmonic current component of normal phase order and the harmonic current component of reverse phase order, i.e., the fifth and seventh harmonic current components, the sixth and 12th components of the magnetic noise can be reduced; accordingly, the frequency of the electric current to be superimposed can be greatly reduced. This serves to solve various problems that may arise when controlling high frequency currents. For example, the load of current control can be reduced, and the degradation of accuracy of electric current phase, etc. can be prevented.

The concept that the (m+1)th, (n−1)th, and (n+m)th magnetic excitation force components can be simultaneously modified (increased or reduced) by superimposing the harmonic current components of the mth harmonic order with the reverse phase order and the nth harmonic order with the same phase order on the fundamental frequency component was also unknown in the prior art and, using this concept, the plurality of excitation force components can be adjusted by adjusting the amplitudes and phases of the mth and nth harmonic current components to be superimposed.

(Modified Mode 2)

The above description has dealt with the concept that two different radially acting harmonic vibration components are generated when one harmonic current component with reverse phase order and one harmonic current component with normal phase order are superimposed on the fundamental frequency component of the stator current, but it will also be noted that, based on a similar technical concept, when three harmonic current components of different harmonic orders, including at least one harmonic current component with reverse phase order and at least one harmonic current component with normal phase order, are superimposed on the fundamental frequency component, various harmonic components of the excitation force that have harmonic orders equal to the differences between the harmonic orders of the respective current components can be generated.

For example, when a first high-order harmonic current component of order 5 with reverse phase order, a second high-order harmonic current component of order 11 with reverse phase order, and a third high-order harmonic current component of order 13 with normal phase order are superimposed on the fundamental frequency component (first component), then the sixth-order excitation force is generated by the combination of the fundamental frequency component and the first high-order harmonic current component, the 12th-order excitation force is generated by the combination of the fundamental frequency component and the second high-order harmonic current component, the 12th-order excitation force is generated by the combination of the fundamental frequency component and the third high-order harmonic current component, the sixth-order excitation force is generated by the combination of the first and second high-order harmonic current components, the 18th-order excitation force is generated by the combination of the first and third high-order harmonic current components, and the 24th-order excitation force is generated by the combination of the second and third high-order harmonic current components. Accordingly, the four excitation force components, i.e., the sixth, 12th, 18th, and 24th components, can be controlled or reduced by adjusting the amplitudes and phases of the above first to third high-order harmonic current components using the previously given mathematical equations, experimental maps, etc. Of course, another high-order harmonic current component having a different harmonic order may be superimposed in addition to the above first to third high-order harmonic components, or more than four high-order harmonic current components of different harmonic orders may be superimposed.

(Specific Control Example of Magnetic Noise Reduction)

It will be understood that the magnetic noise can be easily reduced by using the above-described magnetic noise control methods. For example, as described above, by suitably setting the amplitudes and phases of the fifth harmonic current component of reverse phase order and the seventh harmonic current component of normal phase order to be superimposed on the fundamental frequency component (first component) of the stator current, the sixth-order magnetic noise can be reduced. Of course, in this case, the amplitude of the magnetic noise (vibration) due to the superimposition of the harmonic current components should optimally be set equal to the amplitude of the magnetic noise (vibration) before the superimposition of the harmonic current components, while the phase of the magnetic noise (vibration) due to the superimposition of the harmonic current components should optimally be set opposite to the phase of the magnetic noise before the superimposition of the harmonic current components. However, the present invention is not limited to this particular setting, but the magnetic noise reducing effect can be ensured if the phases of the harmonic currents to be superimposed are set so that the amplitude of the resultant magnetic noise (resultant vibration) resulting from the combination of the magnetic noise (vibration) before the superimposition and the magnetic noise (vibration) due to the superimposition of the harmonic current components will become smaller than the amplitude of the magnetic noise (vibration) before the superimposition.

A magnetic noise control flow for canceling the 6 nth-order magnetic noise (n is a positive integer) will be described in an easy-to-understand manner with reference to FIGS. 9A and 9B.

FIG. 9A shows a magnetic noise generation flow according to the prior art where no harmonic current components for magnetic noise reduction are superimposed. In the motor control apparatus of FIG. 1, as the motor feed current is formed only by the fundamental current command value supplied from the fundamental wave command block 31, the motor feed current consists only of the fundamental current (first-order current) and, as a result, a radial magnetic excitation force of order 6n occurs in the stator core, resulting in the generation of the 6nth-order magnetic noise.

FIG. 9B shows the magnetic noise control flow according to the present embodiment where harmonic current components for magnetic noise reduction are superimposed. In the motor control apparatus of FIG. 1, since harmonic currents of order (6n+1) in normal phase and (6n−1) in reverse phase are superimposed on the fundamental current command value, the motor feed current is a combination of the fundamental current and the normal phase (6n+1)th harmonic current, or a combination of the fundamental current and the reverse phase (6n−1)th harmonic current, or a combination of the fundamental current, the normal phase (6n+1)th harmonic current, and the reverse phase (6n−1)th harmonic current.

Since the superimposition of the normal phase (6n+1)th harmonic current and the reverse phase (6n−1)th harmonic current results in the generation of the 6nth-order radial magnetic excitation force in the stator core, the resultant 6nth-order radial excitation force in the stator core is given by a vector sum of the 6nth-order radial magnetic excitation force due to the fundamental current and the 6nth-order radial magnetic excitation force due to the harmonic currents.

Therefore, it can be seen that if the phase and amplitude of the normal phase (6n+1)th harmonic current or the reverse phase (6n−1)th harmonic current are set so that the 6nth-order radial magnetic excitation force due to the harmonic current components becomes equal in amplitude but opposite in phase to the 6nth-order radial magnetic excitation force due to the fundamental current, the magnetic noise caused by the radial magnetic excitation force in the motor core, which could not be reduced in the prior art, can be canceled. Here, the phases and amplitudes of the harmonic currents to be superimposed may be computed by calculating mathematical equations based on the above theoretical analysis results, but instead, optimum values may be derived through experiment.

EXPERIMENTAL EXAMPLE

Figure 10:
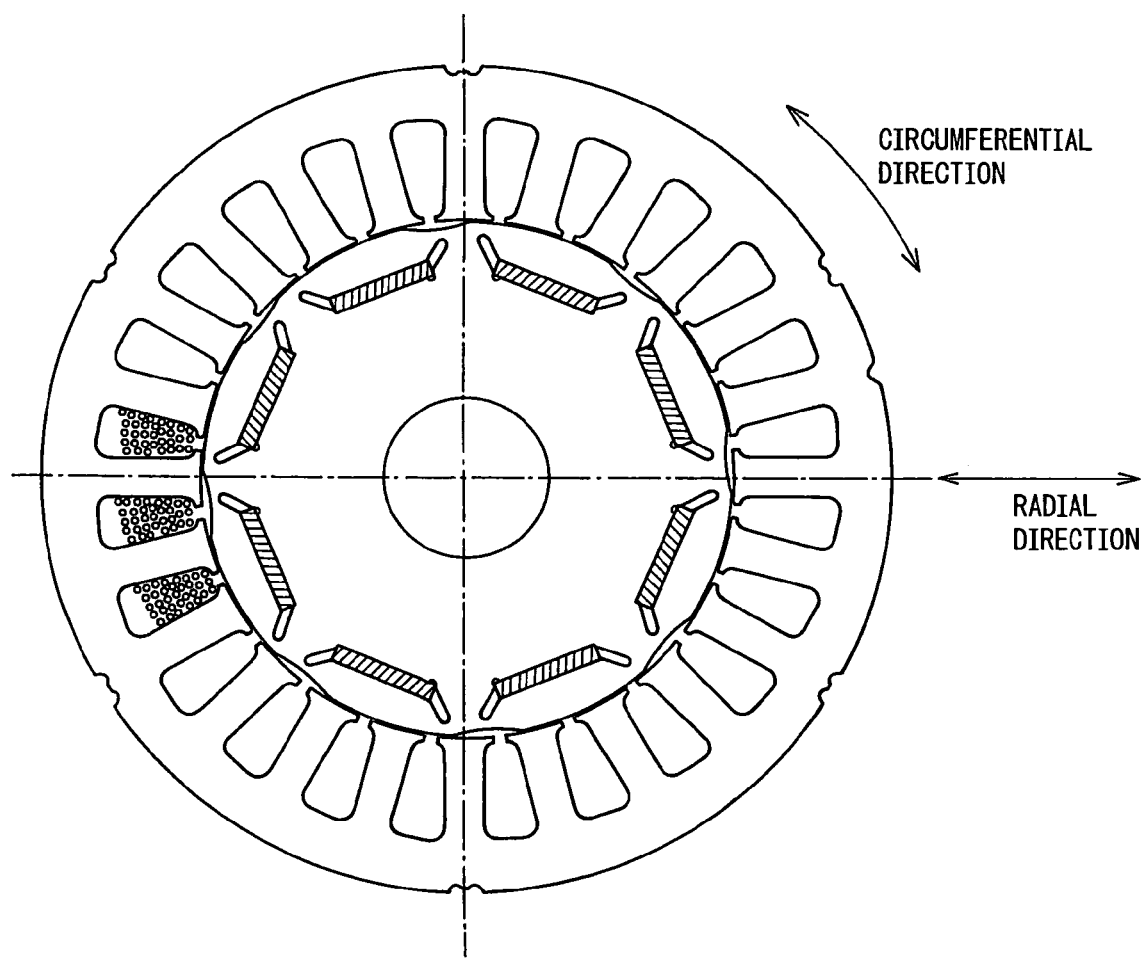
FIG. 10 is a cross-sectional view taken along a radial direction of a three-phase synchronous machine used in an experiment.
Figure 11:
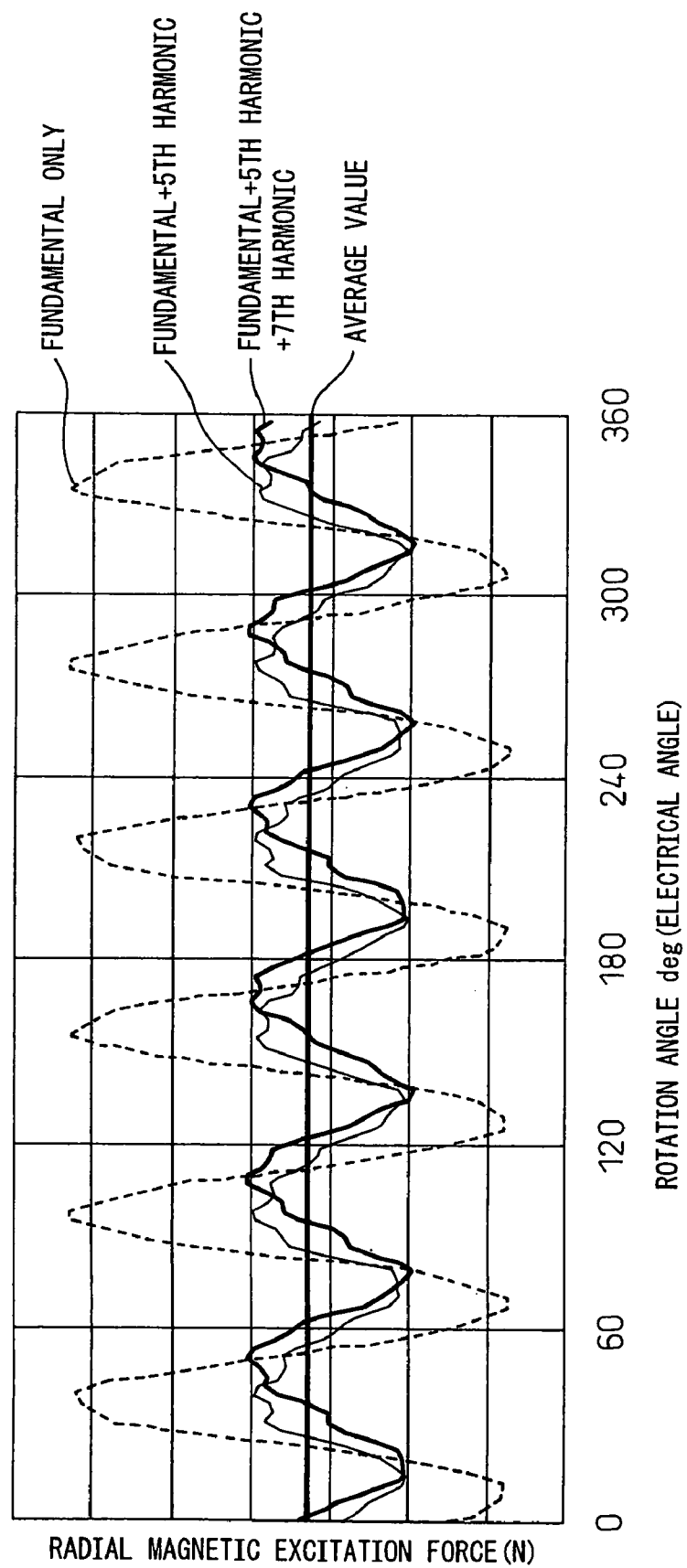
FIG. 11 is a waveform diagram showing the waveforms of radially acting magnetic excitation forces obtained in the experiment using the three-phase synchronous machine of FIG. 10.

An FEM analysis for the reduction of the magnetic noise was performed using the three-phase synchronous machine (8-pole, 24-slot, IPM) shown in FIG. 10. The fundamental frequency component of the stator current was set to 70 A, and the rotor phase angle was set so as to maximize the torque; in this condition, the radial vibration controlling harmonic currents computed by the above method were superimposed, that is, first only the fifth harmonic current having an amplitude 3A and a reserve phase order from that of the fundamental wave was superimposed, and then, in addition to that, the seventh harmonic current having an amplitude 1A and the same phase order as that of the fundamental wave was superimposed, for comparison with the case where no radial vibration controlling harmonic currents were superimposed. The waveforms of the resulting radial magnetic excitation forces are shown in FIG. 11, and their spectra are shown in FIG. 12. As can be seen, by superimposing the fifth harmonic current, the sixth-order excitation force can be reduced, and by further superimposing the seventh harmonic current, the 12th-order excitation force can be reduced. The amplitudes and phases were adjusted so as to be able to reduce the sixth- and 12th-order excitation force components. The excitation force here is the sum of the excitation forces acting on three adjacent teeth, i.e., the sum of the three phases.

Thus, the feature of the present invention is that the (n1−1)th, (n2+1)th, and (n1+n2)th magnetic noise components can be controlled by superimposing the n1th radial vibration controlling harmonic current having the same phase order as that of the fundamental wave and the n2th radial vibration controlling harmonic current having a reverse phase order from that of the fundamental wave, and the present invention can be applied regardless of the number of poles or the number of slots in the rotary electric machine. In this example, the excitation forces acting on adjacent three teeth were summed, as the example showed the case where the number of teeth for each pole and each phase was 1 (24/8/3=1), but the invention is also applicable to other cases. For example, in the case of 8 poles and 48 slots, the sum of the three phases can be obtained by summing six adjacent teeth, and likewise, in the case of 8 poles and 96 slots, the sum of the three phases can be obtained by summing 12 adjacent teeth. Further, in the case of concentrated windings such as 12 poles and 18 slots, adjacent three teeth provide the three phases.

(Modified Mode)

The above control example has been described dealing with the case of open-loop control and feedback current control using a target current value, but the feedback control may also be performed in the following manner. That is, the magnetic noise is directly detected using, for example, a microphone, and a harmonic component of prescribed harmonic order is extracted from it; then, the difference between the harmonic component and its prescribed target value is obtained, the amplitude and phase of the radial vibration controlling harmonic current corresponding the difference to be superimposed to reduce the difference to zero are obtained by calculation or from a map, and the radial vibration controlling harmonic current thus determined is superimposed on the stator current.

Rather than directly detecting the magnetic noise using a microphone, use may be made of the output of a vibration sensor or force detection sensor mounted on the stator core or a search coil or pickup coil for detecting its magnetic field, and feedback control similar to the above described one may be performed so that the output matches the prescribed target value.

The present invention has been described for the case where the harmonic currents are controlled to control the magnetic noise, but it will be appreciated that the invention may be used to control the harmonic currents for other purposes.

While the preferred modes of the present invention have been described in detail above, it will be understood, by those skilled in the art, that various modifications and changes can be made by anyone skilled in the art and that all of such modifications and changes that come within the range of the true spirit and purpose of the present invention fall within the scope of the present invention as defined by the appended claims.

What is claimed is:

1. A motor control apparatus for feedback-controlling a polyphase AC current to be fed to an armature of a polyphase AC rotary electric machine, comprising a harmonic control circuit block, wherein said harmonic control circuit block includes:

a high-order dq coordinate converter for converting said polyphase AC current as a signal in a polyphase AC current coordinate system, into a high-order dq signal which is a signal defined in a high-order dq coordinate system rotating at a frequency corresponding to the harmonic order of a harmonic current component to be controlled from among harmonic current components contained in said polyphase AC current;

a low-pass filter for extracting a DC signal component contained in said high-order dq signal;

a subtractor for obtaining a difference between said DC signal component and a command value for said harmonic current component to be controlled; and a high-order polyphase coordinate converter for converting a signal into said polyphase AC current coordinate system, the signal for asymptotically reducing said difference to zero, wherein said harmonic current component to be controlled is controlled by feeding the harmonic current component output from said harmonic control circuit block to said armature.

2. A motor control apparatus as set forth in claim 1, wherein said high-order dq coordinate converter performs a dq conversion on an nth harmonic current to be superimposed in reverse phase order on a fundamental frequency component, by using a-n th-order coordinate system which is a coordinate system rotating at n times the frequency of said fundamental frequency component in a direction opposite to the direction of rotation of a dq rotating coordinate system rotating synchronously with said fundamental frequency component.

3. A motor control apparatus as set forth in claim 1 or 2, comprising a plurality of said harmonic control circuit blocks wherein the harmonic order of said harmonic current component to be controlled is different for each of said harmonic control circuit blocks.

4. A motor control apparatus as set forth in claims 1 or 2, wherein magnetic noise is modified by controlling said harmonic current component to be controlled and feeding said controlled harmonic current to said armature.

5. A motor control apparatus as set forth in claim 4, wherein
when said harmonic current component output from said harmonic control circuit block has the same phase order as the fundamental frequency component of said polyphase AC current, the harmonic order of said harmonic current component to be controlled is set higher by 1 than the harmonic order of said magnetic noise, and
when said harmonic current component output from said harmonic control circuit block has a reverse phase order from the fundamental frequency component of said polyphase AC current, the harmonic order of said harmonic current component to be controlled is set lower by 1 than the harmonic order of said magnetic noise.

6. A motor control apparatus as set forth in claim 4, wherein
said polyphase AC rotary electric machine is a three-phase AC rotary electric machine, and wherein
when said harmonic current component output from said harmonic control circuit block has the same phase order as the fundamental frequency component of said polyphase AC current, the harmonic order of said harmonic current component to be controlled is set to 6k+1, wherein k is a natural number, and
when said harmonic current component output from said harmonic control circuit block has a reverse phase order from the fundamental frequency component of said polyphase AC current, the harmonic order of said harmonic current component to be controlled is set to 6k−1.

7. A motor control apparatus as set forth in claim 6, wherein said motor control apparatus comprises at least one harmonic current control circuit block for outputting said harmonic current component whose harmonic order is 6k−1, and at least one harmonic current control circuit block for outputting said harmonic current component whose harmonic order is 6k+1.

8. A motor control apparatus as set forth in claims 1 or 2, wherein said harmonic current component of a prescribed order to be superimposed on said polyphase AC current by said harmonic control circuit block is chosen to have an amplitude and phase that reduces the magnetic noise of said polyphase AC rotary electric machine.

9. A motor control apparatus as set forth in claim 3, wherein magnetic noise is modified by controlling said harmonic current component to be controlled and feeding said controlled harmonic current to said armature.

10. A motor control apparatus as set forth in claim 3, wherein said harmonic current component of a prescribed order to be superimposed on said polyphase AC current by said harmonic control circuit block is chosen to have an amplitude and phase that reduces the magnetic noise of said polyphase AC rotary electric machine.

11. A motor control apparatus as set forth in claim 4, wherein said harmonic current component of a prescribed order to be superimposed on said polyphase AC current by said harmonic control circuit block is chosen to have an amplitude and phase that reduces the magnetic noise of said polyphase AC rotary electric machine.

12. A motor control apparatus as set forth in claim 5, wherein said harmonic current component of a prescribed order to be superimposed on said polyphase AC current by said harmonic control circuit block is chosen to have an amplitude and phase that reduces the magnetic noise of said polyphase AC rotary electric machine.

13. A motor control apparatus as set forth in claim 6, wherein said harmonic current component of a prescribed order to be superimposed on said polyphase AC current by said harmonic control circuit block is chosen to have an amplitude and phase that reduces the magnetic noise of said polyphase AC rotary electric machine.

14. A motor control apparatus as set forth in claim 7, wherein said harmonic current component of a prescribed order to be superimposed on said polyphase AC current by said harmonic control circuit block is chosen to have an amplitude and phase that reduces the magnetic noise of said polyphase AC rotary electric machine.

* * * * *